(12) United States Patent
Drexl et al.

(10) Patent No.: US 11,948,163 B2
(45) Date of Patent: Apr. 2, 2024

(54) USER INTERFACE FOR VISUALIZING OUTPUT FROM SUPPLY CHAIN REPLENISHMENT SIMULATION

(71) Applicant: Target Brands, Inc., Minneapolis, MN (US)

(72) Inventors: Moritz Drexl, San Francisco, CA (US); Tikhon Jelvis, Sunnyvale, CA (US); Cory Morris, Minneapolis, MN (US); Michael Staab, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 16/890,821

(22) Filed: Jun. 2, 2020

(65) Prior Publication Data

US 2021/0334829 A1   Oct. 28, 2021

Related U.S. Application Data

(63) Continuation-in-part of application No. 16/858,427, filed on Apr. 24, 2020, now Pat. No. 11,580,490.

(51) Int. Cl.
*G06Q 30/0202* (2023.01)
*G06F 3/0482* (2013.01)
(Continued)

(52) U.S. Cl.
CPC ....... *G06Q 30/0202* (2013.01); *G06F 3/0482* (2013.01); *G06Q 10/06315* (2013.01); *G06Q 10/087* (2013.01)

(58) Field of Classification Search
CPC .. G06Q 10/0639; G06Q 20/203; G06Q 10/08; G06Q 30/0605; G06Q 10/0637;
(Continued)

(56) References Cited

U.S. PATENT DOCUMENTS 5,596,493 A * 1/1997 Tone .................... G06Q 10/087
                                                        705/22
5,953,707 A   9/1999 Huang et al.
(Continued)

FOREIGN PATENT DOCUMENTS

CN   109960826 A   7/2019
JP   2009134468 A  6/2009

OTHER PUBLICATIONS

Performance Dashboards: Measuring, Monitoring, and Managing Your Business TDWI, 2006 (Year: 2006).*
(Continued)

*Primary Examiner* — Scott L Jarrett
(74) *Attorney, Agent, or Firm* — Merchant & Gould P.C.

(57) ABSTRACT

An interactive visualization tool for displaying metrics associated with inventory related output from a replenishment simulation for an enterprise supply chain is described. Predicted values for metrics associated with simulation output may be received on a per item, per node, per epoch basis for a plurality of items associated with the supply chain at a plurality of nodes of the supply chain over a plurality of epochs. A visualization tool user interface may be rendered that includes item and node menus enabling user selection of varying granularity levels for viewing the metrics. The metrics may be aggregated according to a presently selected level of granularity, and represented within a single graphical view of the user interface to visualize projected inventory positions of items across nodes of the supply chain. The aggregated metrics may include an expected projection and a worst-case projection for one or more types of the metrics.

20 Claims, 12 Drawing Sheets

(51) Int. Cl.
*G06Q 10/0631* (2023.01)
*G06Q 10/087* (2023.01)

(58) Field of Classification Search
CPC ........... G06Q 10/087; G06Q 10/06375; G06Q 10/067; G06Q 30/0202; G06Q 10/063; G06Q 10/06393
See application file for complete search history.

(56) References Cited

U.S. PATENT DOCUMENTS

| | | | |
|---|---|---|---|
| 6,609,101 B1 | 8/2003 | Landvater | |
| 7,499,766 B2 | 3/2009 | Knight et al. | |
| 7,526,434 B2* | 4/2009 | Sharp | G06Q 30/02 705/7.29 |
| 7,552,066 B1 | 6/2009 | Landvater | |
| 7,574,383 B1* | 8/2009 | Parasnis | G06Q 10/06315 705/28 |
| 7,716,592 B2* | 5/2010 | Tien | G06Q 40/00 715/744 |
| 7,840,896 B2* | 11/2010 | Tien | G06Q 10/10 715/243 |
| 7,870,012 B2* | 1/2011 | Katz | G06Q 10/06316 705/7.26 |
| 8,126,767 B1* | 2/2012 | Aldridge | G06Q 10/06 705/7.36 |
| 8,209,218 B1* | 6/2012 | Basu | G06Q 10/0637 705/7.39 |
| 8,364,512 B2* | 1/2013 | Hong | G06Q 10/06315 705/7.12 |
| 8,494,823 B2 | 7/2013 | Ding et al. | |
| 8,706,536 B1* | 4/2014 | McPhetrige | G06Q 30/0202 705/7.11 |
| 9,633,323 B2 | 4/2017 | Fairbrother et al. | |
| 9,892,148 B2* | 2/2018 | Heman | G06F 16/2246 |
| 9,990,597 B2 | 6/2018 | He et al. | |
| 10,002,364 B2* | 6/2018 | Gopinath | G06Q 30/0205 |
| 10,062,052 B2 | 8/2018 | Saylor et al. | |
| 10,346,774 B2* | 7/2019 | Martinez | G06Q 10/06315 |
| 10,607,182 B2* | 3/2020 | Shah | G06K 9/00771 |
| 10,896,048 B1* | 1/2021 | Markson | G16H 20/10 |
| 11,093,884 B2* | 8/2021 | Devarakonda | G06F 3/04883 |
| 2005/0177353 A1 | 8/2005 | Slater | |
| 2006/0031084 A1* | 2/2006 | Schierholt | G06Q 10/20 705/7.12 |
| 2006/0167704 A1* | 7/2006 | Nicholls | G06Q 10/06393 705/7.39 |
| 2008/0183786 A1* | 7/2008 | Shimizu | G06Q 10/06393 708/250 |
| 2008/0312978 A1* | 12/2008 | Binney | G06Q 10/06 705/28 |
| 2008/0312987 A1* | 12/2008 | Damodaran | G06Q 10/087 705/7.27 |
| 2009/0030667 A1 | 1/2009 | Toloo et al. | |
| 2009/0157447 A1* | 6/2009 | Busch | G06F 16/2428 705/7.38 |
| 2009/0319469 A1* | 12/2009 | Lesser | G06F 16/9535 |
| 2010/0114554 A1* | 5/2010 | Misra | G06Q 10/00 703/22 |
| 2010/0138281 A1* | 6/2010 | Zhang | G06Q 20/203 705/28 |
| 2011/0061013 A1* | 3/2011 | Bilicki | G06Q 10/06393 715/771 |
| 2011/0106723 A1* | 5/2011 | Chipley | G06Q 10/06375 705/348 |
| 2011/0261049 A1* | 10/2011 | Cardno | G06Q 10/10 345/419 |
| 2011/0270646 A1* | 11/2011 | Prasanna | G06Q 10/0633 705/7.27 |
| 2012/0144335 A1* | 6/2012 | Abeln | G06Q 10/087 715/771 |
| 2013/0018696 A1* | 1/2013 | Meldrum | G06Q 10/06 705/7.27 |
| 2013/0024225 A1 | 1/2013 | Perry et al. | |
| 2013/0060603 A1* | 3/2013 | Wagner | G06Q 30/0202 705/7.29 |
| 2015/0254589 A1* | 9/2015 | Saxena | G06Q 10/087 705/7.25 |
| 2015/0310343 A1* | 10/2015 | Netz | G06N 5/048 706/11 |
| 2016/0112278 A1* | 4/2016 | Sangli | G06T 11/001 715/736 |
| 2017/0235466 A1* | 8/2017 | Tanwir | G06F 9/451 715/738 |
| 2018/0075401 A1* | 3/2018 | Harsha | G06Q 30/0202 |
| 2018/0150788 A1* | 5/2018 | Vepakomma | G06Q 10/087 |
| 2018/0330299 A1* | 11/2018 | Chen | G06Q 10/06393 |
| 2019/0347606 A1* | 11/2019 | Malecha | G06Q 10/087 |

OTHER PUBLICATIONS

Oracle Retail Replenishment Optimization—User Guide—Release 13.0 Oracle, Apr. 2008 (Year: 2008).*
Oracle Retail Advanced Inventory Planning, Store Replenishment Planning User Guide—Release 13.0 Oracle, Jun. 2008 (Year: 2008).*
Retek Advanced Inventory Planning 11.1—User Guide—Warehouse Replenishment Planning Retek, 2004 (Year: 2004).*
Oracle Retail Data Model, Release 11/3.2, Reference Oracle, Jul. 2013 (Year: 2013).*
Oracle Hyperion Planning—Predictive Planning in Smart View User's Guide Release 11.1.2.4 Oracle, Nov. 2016 (Year: 2016).*
Jalali et al., "Simulation optimization in inventories replenishment: a classification"; Research Center for Operation Management, Department of Decision Sciences and Information Management; 32 Pages, 2013.
Hellstrom et al., "Using Discrete Event Simulation in Supply Chain Planning"; 14 Pages, 2002.
Thierry et al., "Supply Chain Management Simulation: An Overview"; 36 Pages, 2008.
Genc et al., "Event-Based Supply Chain Early Warning System for an Adaptive Production Control", Procedia CIRP 19, 6 Pages, 2014.
Umeda, S. and Jones, A . . . , "Virtual Supply Chain Management System: A decision support system using discrete event simulation"; National Institute of Standards and Technology, 8 Pages, 1995.
Supply Chain Simulation Software—Any Logic Simulation Software, 5 Pages, Jul. 21, 2019.
U.S. Appl. No. 62/776,327, filed Dec. 6, 2018—entitled Platform Using Swappable Policies to Simulate and Perform Warehouse Processes; 51 Pages.
U.S. Appl. No. 62/835,961, filed Apr. 18, 2019—entitled Platform Using Instruction Engine to Simulate and Perform Warehouse Processes, 56 Pages.
Oracle Demand Management Cloud Data Sheet, Supply Chain Management Cloud; 14 Pages, 2019.

* cited by examiner

US 11,948,163 B2

USER INTERFACE FOR VISUALIZING OUTPUT FROM SUPPLY CHAIN REPLENISHMENT SIMULATION

CROSS-REFERENCE TO RELATED APPLICATIONS

This application is a continuation-in-part of U.S. application Ser. No. 16/858,427 filed on Apr. 24, 2020, now U.S. Pat. No. 11,580,490, the disclosure of which is hereby incorporated by reference in its entirety.

BACKGROUND

A supply chain network of an enterprise may be comprised of nodes, including distribution centers and stores. Units of an inventory item may initially flow from a distribution center to a store through an initial fulfillment process that is initiated by the store submitting a transfer order to the distribution center. As a number of units of the inventory item diminish and/or more units are desired at the store, subsequent units of the inventory item may be provided from the distribution center to the store through a replenishment process that is similarly initiated by the store submitting a transfer order to the distribution center.

The timing and logic involved in a replenishment process is complex. For example, a replenishment process may involve the flow of inventory item units from the distribution center to the store responsive to transfer orders, but may be based on, e.g., inventory levels, re-order points, stocking levels, picking and packing management, order lead times, and/or transit times, among other similar factors. Still further, in supply chain systems of significant size and complexity (e.g., often including hundreds or thousands of store locations, numerous distribution centers, and vendors) decisions regarding how best to allocate inventory across that supply chain are highly complex, due to the changing demand, inventory levels, etc. at each location. Accordingly, it can be difficult to visualize or model how a particular item or collection of items flows through a supply chain with an adequate level of detail to avoid significant real-world consequences such as out-of-stock events.

In some instances, simulation systems have been developed that assist with modeling, at a high level of generality, movement of an item within a supply chain. However, such simulation systems have drawbacks. For example, because of the non-deterministic nature of some supply chain inputs (e.g., demand, availability times for particular items, etc.) outcomes of simulations may vary between runs of the simulation, leading to uncertainty in outcomes. Still further, some aspects of supply chain operation may be non-deterministic as well (e.g., handling times at particular supply chain nodes, transit times, etc.), leading to greater uncertainty in simulation outcomes. This is because simulations typically must use, at the time of execution, discrete values selected from those non-deterministic inputs and operational parameters, leading to variability in simulation results.

Particularly when applied to very large scale supply chain systems, the above challenges are exacerbated. This is because variable/non-deterministic occurrences at one location in a supply chain (e.g., a large demand at a particular store, or a delay in shipment that may occur occasionally) may have drastic effects on other portions of the supply chain. Additionally, while repeated execution of such simulations may provide some insight into the possible simulation outcomes, such repeated operation may require significant computation resources, particularly if the simulation is performed with a high level of granularity that is often required to obtain insights regarding potential supply chain interruptions.

Moreover, the simulation systems that have been developed lack tools for efficiently visualizing the simulation results, particularly for large scale supply chain systems. For example, current systems are limited to piecemeal visualizations representing different portions of the simulation results that require analysts to switch between views, tabs, and/or pages to consult all simulation data. This makes the simulation data more difficult to interpret as a whole, which hinders the revelation of insights about how best to allocate inventory across the supply chain while avoiding potential supply chain interruptions. Additionally, these tools lack capability to easily change a scale (e.g., adjust a granularity) at which the simulation results are aggregated and viewed across a supply chain system.

Accordingly, it is with respect to these and other general considerations that embodiments have been described.

SUMMARY

In accordance with the present disclosure, the above and other issues are addressed by the following:

In a first aspect, example methods for visualizing projected inventory positions of items across nodes of a supply chain network are described. An example method includes receiving predicted values of metrics associated with an output of a replenishment simulation for the supply chain network. The output may be related to inventory and changes thereto for a plurality of items at a plurality of nodes over a plurality of epochs, and the predicted values for the metrics may be received on a per item, per node, per epoch basis. The example may also include rendering on a display, as part of a visualization tool user interface, an item menu comprising the plurality of items for selection and a node menu comprising the plurality of nodes for selection. The item menu and the node menu may enable a user to select a level of granularity for viewing the metrics. The example method may further include receiving a selection of one or more items from the item menu and a selection of one or more nodes from the node menu, the received selections corresponding to a first level of granularity, and, for each metric, aggregating the predicted values of the respective metric at the first level of granularity on a per epoch basis. The example method may yet further include rendering on the display, as part of the visualization tool user interface, a single graphical view representing at least a portion of the aggregated metrics at the first level of granularity over at least a portion of the plurality of epochs, where the portion of the aggregated metrics includes an expected projection and a worst case projection for one or more metric types.

In a second aspect, example computing devices are described. An example computing device may include a display, a processor, and a memory communicatively coupled to the processor. The memory stores instructions that, when executed by the processor, cause the system to render on the display, as part of a visualization tool user interface, an item menu comprising a plurality of selectable items associated with the supply chain network and a node menu comprising a plurality of selectable nodes of the supply chain network, receive a selection of one or more items from the item menu and a selection of one or more nodes from the node menu, and render on the display, as part of the visualization tool user interface, a single graphical view representing a subset of metrics for the selected one or more items at the selected one or more nodes over a plurality of epochs. The metrics may be associated with output of a replenishment simulation for the supply chain network, where the output is related to inventory and changes thereto over the plurality of epochs, and the subset of the metrics may include at least an expected projection and a worst case projection for one or more metric types.

In a third aspect, example computing systems are described that include a processor and a memory, the memory storing instructions for executing a visualization tool application, that when executed by the processer, generates a user interface for displaying projected inventory positions of items across nodes of a supply chain network. An example user interface includes an item menu comprising a plurality of selectable items associated with the supply chain network, a node menu comprising a plurality of selectable nodes of the supply chain network, and a single graphical view representing a first set of metrics for one or more items selected from the item menu at one or more nodes selected from the node menu over a plurality of epochs. The metrics may be associated with output of a replenishment simulation for the supply chain network, where the output is related to inventory and changes thereto over the plurality of epochs, and the first set of the metrics may include at least an expected projection and a worst case projection for one or more metric types.

BRIEF DESCRIPTION OF THE DRAWINGS

Non-limiting and non-exhaustive examples are described with reference to the following figures.

DETAILED DESCRIPTION

Figure 1:
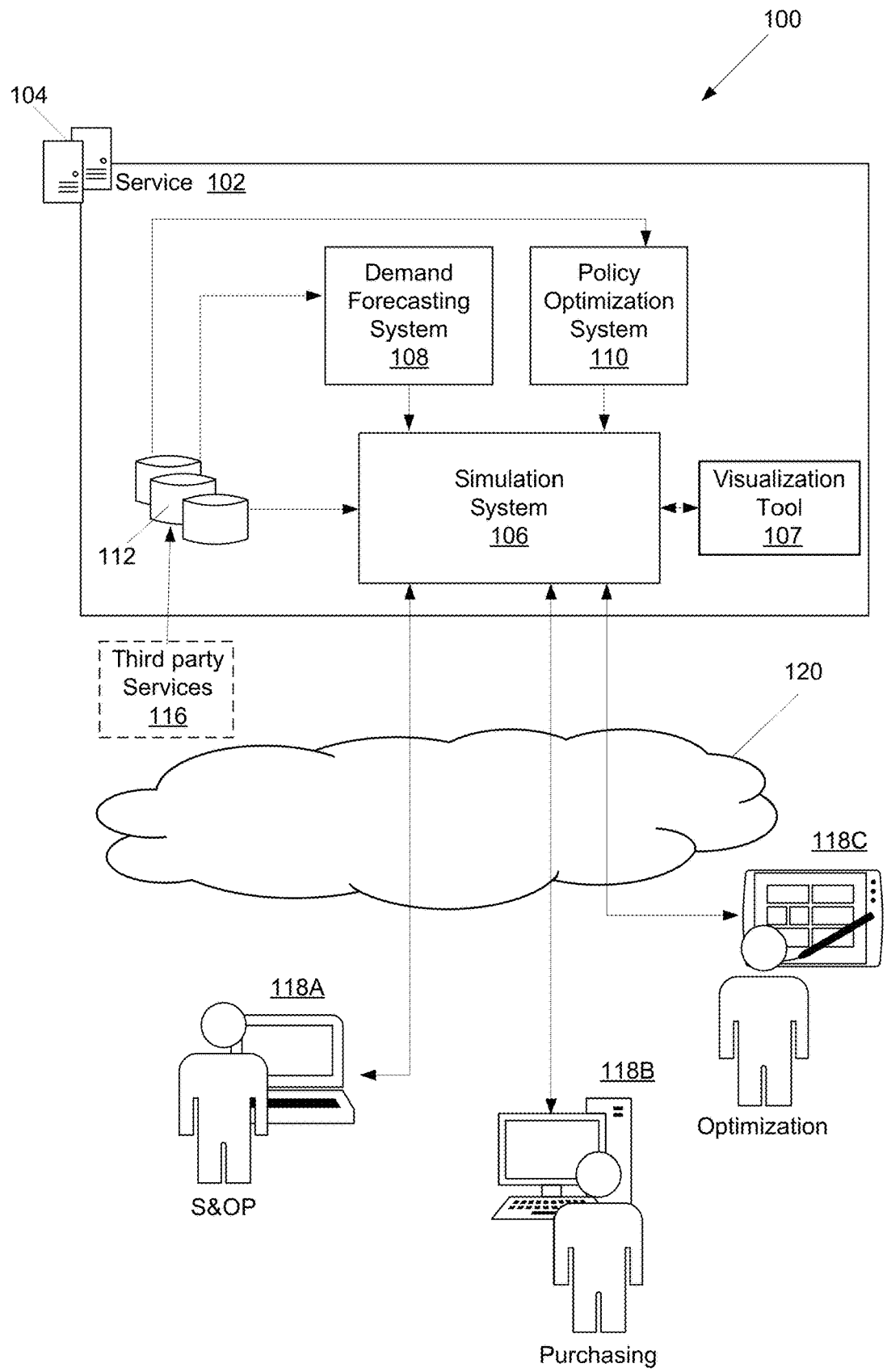
FIG. 1 illustrates an example network environment where a system to simulate supply chain replenishment may be implemented.

Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims.

Aspects of the present invention are directed to an event-based replenishment simulation system for a supply chain of an enterprise. As previously discussed, units of an item may flow between nodes of the supply chain network (e.g., from a vendor to a distribution center, and in turn to a store). These processes may be initiated by purchase orders and/or transfer orders that indicate a quantity of item units, source and destination nodes, and a transit schedule. Initiation of transfer orders within a large-scale supply chain may be based on inventory levels, re-order points, stocking levels, order lead times, transit times, and/or purchase order changes, among other data, in addition to demand forecasts. A transfer order may have many additional or subsidiary effects on stock levels and handling processes, including breakage of package sizes, which may trigger additional processes for stocking and inventory counting/control.

Thus, to account for the complexity when simulating supply chain replenishment, inputs such as business process data and assumptions, including supply chain logic and policies, are provided for the simulation in addition to demand forecast. Based on these inputs, the simulation may output data related to inventory and changes thereto that can be used for predicting a run-state of the supply chain for tens to hundreds of days in the future to inform labor planning decisions and vendor purchases, among other business decisions. Additionally, the simulation may enable experimentation (e.g., performance of "what if" scenarios) and debugging to determine how changes to certain inputs, including demand, supply chain logic, and policies, effect the replenishment process.

In some examples, because replenishment is specific to each item and each node, the supply chain in the simulation is described at a per-item, per-node level by an amount of inventory and a list of incoming transfers. A run-state of the supply chain is a function of time, and the time evolution of the run-state of the supply chain is governed by supply chain dynamics. The dynamics may be effected by sales (e.g., the realization of demand and item availability), transfers (e.g., the realization of scheduled moves between nodes), and policy evaluation (e.g., policy decisions made to update transfer schedule), and thus inputs to the simulation include forecasted demand, supply chain domain logic, and policies.

Additionally, the simulation is formed around events. An event refers to a piece of data at a specific moment of time and may represent changes or new observations about a system or process. For example, simulation dynamics may be described generally as taking in action events determined based on the inputs to the simulation, and producing observation events as a result of and/or corresponding to the current action events. Increased specificity of the events can facilitate the building and interpreting of a highly granular simulation. As one example, a forecasted demand provided as input to the simulation may include a single event for an epoch (e.g., five sales for a day) or, if higher granularity is desired, the forecasted demand may include multiple events at particular times over the epoch (e.g. one sale in early morning after opening, three sales around noon hour, and one sale just prior to closing, or some other configurable timing over the course of the day). Accordingly, a user of the simulation system described herein may, at the time of simulation, select a desired level of granularity of particular events, thereby providing run-time configurable tradeoff between increased detail and computational complexity or reduced detail and lower computational complexity.

The events (e.g., including input events and observation events) are then transformed into metrics through an aggregation process that is independent of the simulation dynamics. Some of the inputs to the simulation, such as forecasted demand and certain aspects of the supply chain domain logic, represent random processes that are sources of uncertainty in any metric that the simulation produces. Therefore, to better assess and remove uncertainty from the metrics output, the simulation may be repetitively re-run using different discrete values for that given metric (e.g., weighted according to a statistical distribution of possible values) to produce a sample of traces that can be aggregated and used to build statistics regarding supply chain operation.

In some examples, the simulation may be run on a per-epoch basis for a plurality of epochs. For example, an epoch may be a day, and the simulation may be run for more than one epoch, e.g., to predict the run-state of the supply chain for up to hundreds of days into the future on a per-item, per-node basis. Moreover, although the simulation is performed on a per-item, per-node basis, iterations of the simulation may be run for a plurality of items at a node, and across a plurality of nodes of the enterprise. Resultantly, a future-state of the supply chain for the plurality of epochs may be generated that represents the plurality of nodes of the network and the plurality of items at each node. Additionally, the simulation may be highly parallel and scalable by separating iterations of a specific item or iterations for different items, on different nodes for easy consumption and clustering.

In further examples, the data output from the simulation may be provided as input to a visualization tool. Metrics associated with the simulation output may be displayed through a user interface of the visualization tool that includes graphical, tabular, and list views. The graphical view may represent a plurality of simulation data types in a single, consolidated graphical view to enable easier consumption of the data as a whole without having to switch between different views, tabs, and/or pages, for example. Additionally, a user, such as an inventory management data analyst, interacting with the visualization tool, can select varying levels of granularity to view the metrics using item and node menus of the user interface. The highly parallel and scalable nature of the simulation data facilitates easy scaling of the data up or down based on the level of granularity selected. For example, the user can select one or more items at one or more nodes across the supply chain to identify trends or patterns that may inform how to optimize the supply chain.

FIG. 1 illustrates an example network environment where a system 106 to simulate supply chain replenishment may be implemented, referred to hereafter as the simulation system 106. The simulation system 106 may be hosted by a service 102. In some examples, the service 102 may also host a visualization tool 107, a demand forecasting system 108 and a policy optimization system 110. One or more servers or processors 104 may be operable to execute one or more components of the service 102, including the simulation system 106, the visualization tool 107, the demand forecasting system 108, and the policy optimization system 110. In other examples, one or more of the visualization tool 107, demand forecasting system 108 and the policy optimization system 110 are hosted externally by third party services 116.

In some examples, the service 102 may be associated with an enterprise, such as a retail enterprise that offers goods and/or services, also referred to herein as items, directly to consumers. In addition to online channels, the enterprise may have a plurality of physical stores through which items are sold. Additionally, the enterprise may have or be associated with one or more distribution centers that store the items until they are needed at one or more of the stores, or delivered directly to customers via online sales channels. The distribution centers and stores may comprise nodes of a supply chain network for the enterprise.

The simulation system 106 may perform the simulation on a per-item, per-node, and per-epoch basis. As per-epoch input, the simulation system 106 may receive at least supply chain domain logic, a demand for an item at a node predicted by the demand forecasting system 108, and one or more policies generated by the policy optimization system 110. As described in more detail with reference to FIGS. 2-6 below, the simulation system 106 may process the domain logic, the demand, and the policies to generate a stream of action events. A stream of corresponding observed events may be generated from the stream of action events. The stream of observed events, optionally in combination with the action events and inputs, may then be transformed into metrics, and values thereof are provided as output of the simulation system 106.

In some examples, one or more of the inputs received by the simulation system 106 may be generated internally by the service 102 and subsequently stored in the data stores 112. In other examples, one or more of the inputs may be generated externally by the third party services 116 and provided to the service 102 for storage in the data stores 112. As described in greater detail with reference to FIG. 3, at least some of the supply chain domain logic received as input may include network inputs, product inputs, node inputs, arc inputs, and operation perturbations, among other example inputs. Some portions of the supply chain domain logic in addition to other data may be used by the demand forecasting system 108 to predict the demand for the item and the policy optimization system 110 to generate one or more policies. In some examples, each type of data may be stored in separate data stores 112. In other examples, the various types of data may be combined in one or more of the data stores 112.

In one embodiment, the service 102 may interoperate with various applications to enable users affiliated with the enterprise to submit requested metrics to and subsequently receive corresponding values for the metrics (e.g., the output from the simulation system 106) over a network 120. For example, the users may execute a thin version of an application (e.g., a web browser) or a thick version of the application (e.g., a locally installed application) through devices 118A, 118B, and 118C, collectively devices 118. The devices 118 may include a desktop computer, a laptop computer, a tablet computer, a smart phone, or wearable computing device, among other similar devices. An application programming interface (API) may facilitate communication between the service 102 and the devices 118 and/or the simulation system 106 and the devices 118 over one or more networks, such as the network 120. In other examples, the application can be hosted by a third party service, such as one of the third party services 116, where the third party service serves as a communication intermediary between the service 102 or simulation system 106 and devices 118.

In some examples, the users may be affiliated with different aspects of the enterprise supply chain management, such as sales and operations planning (S&OP), purchasing, and optimization. One or more of S&OP, purchasing, and optimization, may utilize certain types of the output (e.g., values for certain metrics) as input for subsequent processes. Therefore, the types of metrics requested may be based on which aspect of the enterprise supply chain management the user is affiliated with, as discussed in greater detail with reference to FIG. 6 below. The types of metrics requested may be additionally or alternatively based on a type of simulation being performed, as discussed in greater detail with reference to FIG. 6 below.

In additional examples, the output of the simulation system 106 (e.g., values for the metrics requested) may be provided to the visualization tool 107. The visualization tool 107 may generate an interactive user interface (e.g., a visualization tool user interface) that is rendered on a display of the user's device 118. As described in greater detail with reference to FIG. 8-10 below, the user interface may display projected inventory positions of items across the nodes of the supply chain based on a level of granularity selected by the user to view metrics associated with the output.

Figure 2:
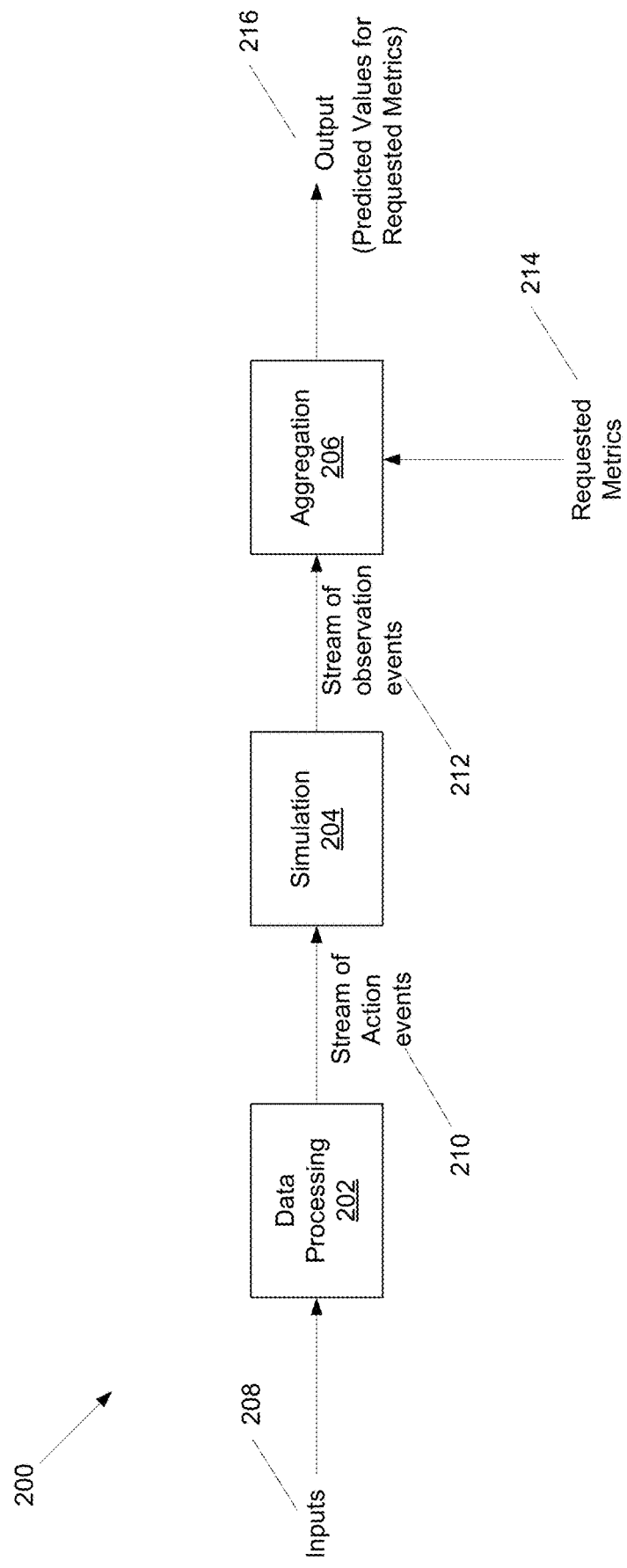
FIG. 2 is a conceptual diagram illustrating example processes of the simulation system.

FIG. 2 is a conceptual diagram illustrating example processes 200 of the simulation system 106. Example processes performed by the simulation system 106 may include at least data processing 202, simulation 204, and aggregation 206. The simulation system 106 may perform these processes on a per-item, per-node, and per-epoch basis for an enterprise supply chain network.

In some examples, the node may be a store (e.g., a child node) that receives and sells items. In other examples, the node may be a distribution center (e.g., a parent node) that receives and processes items to send to one or more stores or other distribution centers. For the simulation system 106, the node defines at least an initial state of inventory, including whether the item is in a backroom or on a shelf, and business parameters, including shelf capacity and package count, for the node. If the node is a distribution center, the node further defines the child nodes it replenishes and a lead time to reach each of the child nodes, incoming vendor purchase plans, and truck mechanics (e.g., truck schedules).

An epoch may be a predefined interval of time. One example epoch may be a day defined by a node's hours (e.g., from opening until closing). More specifically, the epoch may be a day that has not yet occurred, and thus the epoch may be a future epoch. A number of epochs to be run by the simulation system 106 may be defined. As one example, a plurality of epochs up to hundreds of days into the future may be defined.

Additionally, because the simulation system 106 utilizes input data associated with random processes, such as demand or even scheduled transfers, predicted values for requested metrics output by the simulation system 106 may have lesser certainty. Therefore, to increase certainty, the simulation system 106 may repetitively perform these processes for a same item at a same node per epoch to build statistics for the underlying probability distribution. For example, execution of the data processing 202, simulation 204, and aggregation 206 processes for an item at a node for a given epoch may constitute a single trace. These processes may be repeated to generate a plurality of traces for the item at the node for the given epoch. Predicted values for the metrics may be aggregated over the plurality of traces to generate statistics, such as mean, standard deviation, or specific quantiles, for provision as output of the simulation system 106.

As described in greater detail with reference to FIG. 3, during the data processing 202, inputs 208 may be received and processed to generate a plurality of action events. The inputs 208 may include domain logic associated with the supply chain, demand predicted for the item at the node provided by the demand forecasting system 108, and one or more policies generated by policy optimization system 110. In some examples, the generated action events may then be merged to form a stream of action events 210.

Additionally, during the data processing 202, options for defining the simulation process may be selected. For example, a number of traces to be performed may be selected. Also, which statistics are to be computed over the traces may be selected. Further, a time span for the simulation (e.g., the number of epochs to be run) may be selected.

As described in greater detail with reference to FIGS. 4-5, the stream of action events 210 formed from the data processing 202 may be applied to a current run-state of the supply chain during the simulation 204 to yield a stream of observation events 212. The current run-state of supply chain may represent inventory for the item across nodes and on-order transfers. In some examples, the stream of observation events 212 may correspond one to one with the stream of action events 210. For example, every action event within the stream of action events 210 may yield a corresponding observation event within the stream of observation events 212. In other examples, one or more of the action events within the stream of action events 210 may not be observable (e.g., may not have a corresponding observation event). If an action event is not observable, the action event may be performed on the run-state of the supply chain, however a decision may be made that no observation event is to be output as part of the stream of observation events 212. In further examples, the simulation 204 may yield an observation event corresponding to an outside cadence rather than an action event that is included in the stream of observation events 212.

As described in greater detail with reference to FIG. 6, the stream of observation events 212 yielded from the simulation 204 may be transformed to generate one or more metrics during the aggregation 206. The transformation performed during the aggregation 206 may be based on requested metrics 214 received as input from a user. Often, the requested metrics 214 are related to inventory and changes thereto over the epoch. Predicted values for the requested metrics 214 may be provided as output 216 of the simulation system 106. The output 216 may be provided periodically (e.g., provided per epoch) or upon demand. In some examples, additional reporting or post-processing logic may be applied to the metrics. Additionally or alternatively, the stream of observation events 212 (e.g., pre-transformation raw data) may be used as inputs in another process or simulation.

Figure 3:
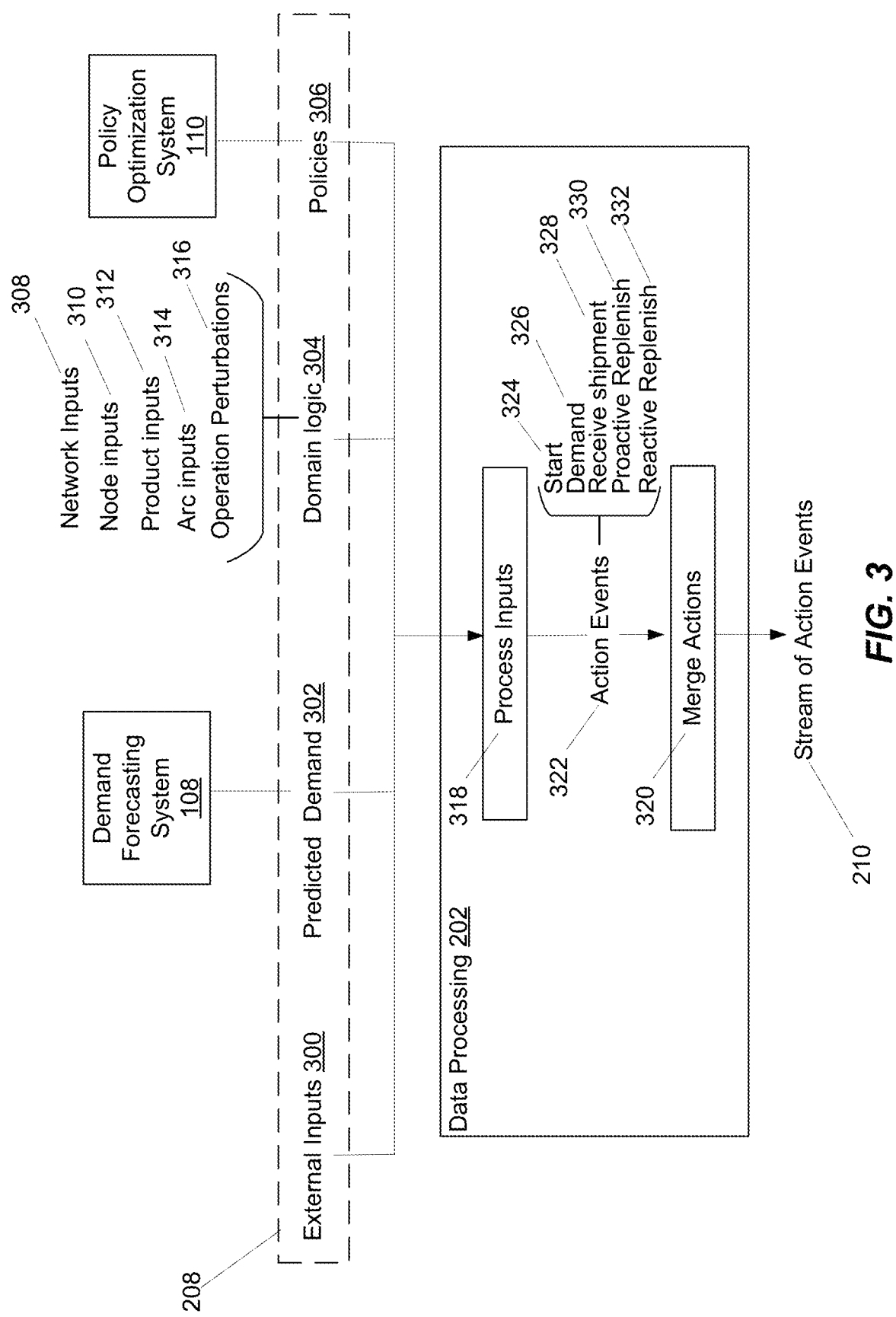
FIG. 3 illustrates example data processing performed by the simulation system.

FIG. 3 illustrates an example of the data processing 202 performed by the simulation system 106. The simulation system 106 may receive a plurality of inputs 208 for a given epoch, where the epoch may be a day. Example inputs 208 may include external inputs 300, predicted demand 302 for the product, domain logic 304 associated with the supply chain, and one or more policies 306.

The external inputs 300 may include known inputs associated with the epoch such as weather, incentive programs, and/or a date, among other examples. The predicted demand 302 for the product may be determined by the demand forecasting system 108. Demand is a quantity of the item that consumers are willing and able to purchase at various prices during a given period of time. A retailer wants to have enough units of the item at a store to satisfy consumer demands. Ordering too many units increases holding costs and the risk of losses due to spoilage or the product becoming outdated or undesirable. Ordering too few of units increases the risk of lost sales and unsatisfied consumers. Thus, when a store sends a transfer order to a distribution center to replenish units of the item at the store, for example, the store may utilize the demand forecasting system 108 to predict demand so that an appropriate number of units are ordered.

Processes that are not fully understood, and whose outcomes cannot be precisely predicted, are often called uncertain or non-deterministic. Additionally, processes that have a range of possible values and have some variation may be referred to as stochastic. Demand is one example. Models explicitly recognizing the stochastic nature of demand may be implemented by the demand forecasting system 108 in order to more accurately predict demand. For example, the predicted demand 302 may be provided as a probability distribution of demand for the product on the given epoch (e.g., a number of products predicted to be purchased on the given day). The day may be defined based on store hours during which purchases can be made, such as from open to close of the store. The demand forecasting system 108 may utilize a variety of data to determine the predicted demand 302. Non-limiting and non-exclusive examples include one or more of items sales data (e.g., a number of units of the item sold), price data (e.g., a number of units of the item sold at a particular price, and inventory data (e.g., a number of remaining units of the item), among other similar data.

The demand forecasting system 108 may output the predicted demand 302 at varying levels of granularity. In some examples, the total number of products predicted to be purchased on the particular day may be represented as one event. In other examples, the number of products predicted to be purchased on the particular day may be represented as many events spread out over the day corresponding to times of day likely to be purchased. Whether one event versus many events are output may be a tradeoff between computational cost and accuracy. For example, one event may require less computational processing, and thus cost, but is less accurate. In contrast, many events may require more computational processing, and thus cost, but provides greater accuracy. Thus, often times, whether one event versus many events are output by the demand forecasting system 108 may be based on a use case for the simulation. For example, if the output 216 of the simulation system 106 is being subsequently fed into a purchasing system to determine a number of items that will be withdrawn over time from a distribution center, then representing the predicted demand 302 as one event may be sufficient for yielding information needed as input to the purchasing system (e.g., the additional processing to generate many events is not necessary).

The domain logic 304 may include network inputs 308, node inputs 310, product inputs 312, arc inputs 314, and operation perturbations 316. Example network inputs 308 may include types and locations of nodes and valid edges or arcs between the nodes. A node may be a supplier, a distribution center or a store, among other facilities in the supply chain network, and an edge or an arc may connect two nodes in a direction of the product flow to show a route for transporting the product between the two nodes. Example node inputs 310 may include a throughput capacity (in units) of a node, a storage area capacity by unit type (e.g., pallets, casepacks, eaches), a processing cost per unit, a processing lead time (e.g., a time from start to end of processing), an ordering schedule for supply nodes, and initial inventory.

Example product inputs 312 may include dimensions or volume of an individual unit (e.g., an each) of the product, a number of eaches per case, dimensions or volume of a casepack, a number of cases per pallet, and special attributes of the product. The special attributes of the product may describe a category of the product (e.g., apparel) or properties associated with the product or its packaging (e.g., nonconveyable, flammable, or perishable). Example arc inputs 314 may include dimensions or volume of a load, a transportation cost per load, and a transportation lead time (e.g., a time from start to end of transport).

Example operation perturbations 316 may include disruptions to a normal operation of the supply chain, such as lead time. Lead time may be present at various stages of the supply chain, including item processing at the distribution center, transportation from a distribution center to a store, and/or item processing at the store. Similar to demand, lead time may be uncertain or stochastic. Therefore, a model explicitly recognizing the stochastic nature of lead time may be implemented in order to more accurately predict lead-time related operation perturbations 316 for provision as one of the inputs. For example, a nominal value with an error model may be determined or a nominal value and an actual value may be determined.

The policies 306 may be generated by the policy optimization system 110. The policies 306 may be generated based on a current run-state of the supply chain and one or more business objectives set by the retail enterprise. A policy is a function that returns a decision, given the information about the system. The goal of the policy may be to optimize an objective over time and may make assumptions about demand and lead times. Here, the policies 306 may be associated with replenishment.

One or more of the policies 306 may be evaluated at a single fixed time of day, hereafter referred to as a proactive policy. Similarly, a multi-batch proactive policy may allow for multiple fixed decision times throughout the day. Additionally or alternatively, one or more of the policies 306 may be a reactive policy that is evaluated one or more times a day in response to receiving new information about the current run-state of the supply chain or the one or more business objectives, hereinafter referred to as a reactive policy. Moreover, the policies may include one or both of request and allocation policies, where the request policies may be variants of order-up-to-level (OTL) policies and the allocation policies may be variants of round robin policies.

During the data processing 202, operations 318 and 320 may be performed by the simulation system 106. At operation 318, the inputs 208, including the external inputs 300, the predicted demand 302, the domain logic 304, and the policies 306, may be processed to generate a plurality of action events 322. At operation 320, the generated action events 322 may then be merged to form the stream of action events 210. In some examples, multiplexing techniques may be performed to merge the action events 322 to form the stream of action events 210.

Example action events 322 may include a start action event 324, a demand action event 326, a receive shipment action event 328, a proactive replenish action event 330, and a reactive replenish action event 332. As one example, a truck schedule may be received as one of the inputs 208. The truck schedule may be processed to generate one or more receive shipment action events 328. As another example, the predicted demand 302 may be processed to generate one or more demand action events 326. As a further example, the policies 306 received as one of the inputs 208 may be processed to generate corresponding start action events 324, proactive replenish action events 330, and reactive replenish action events 332.

Figure 4:
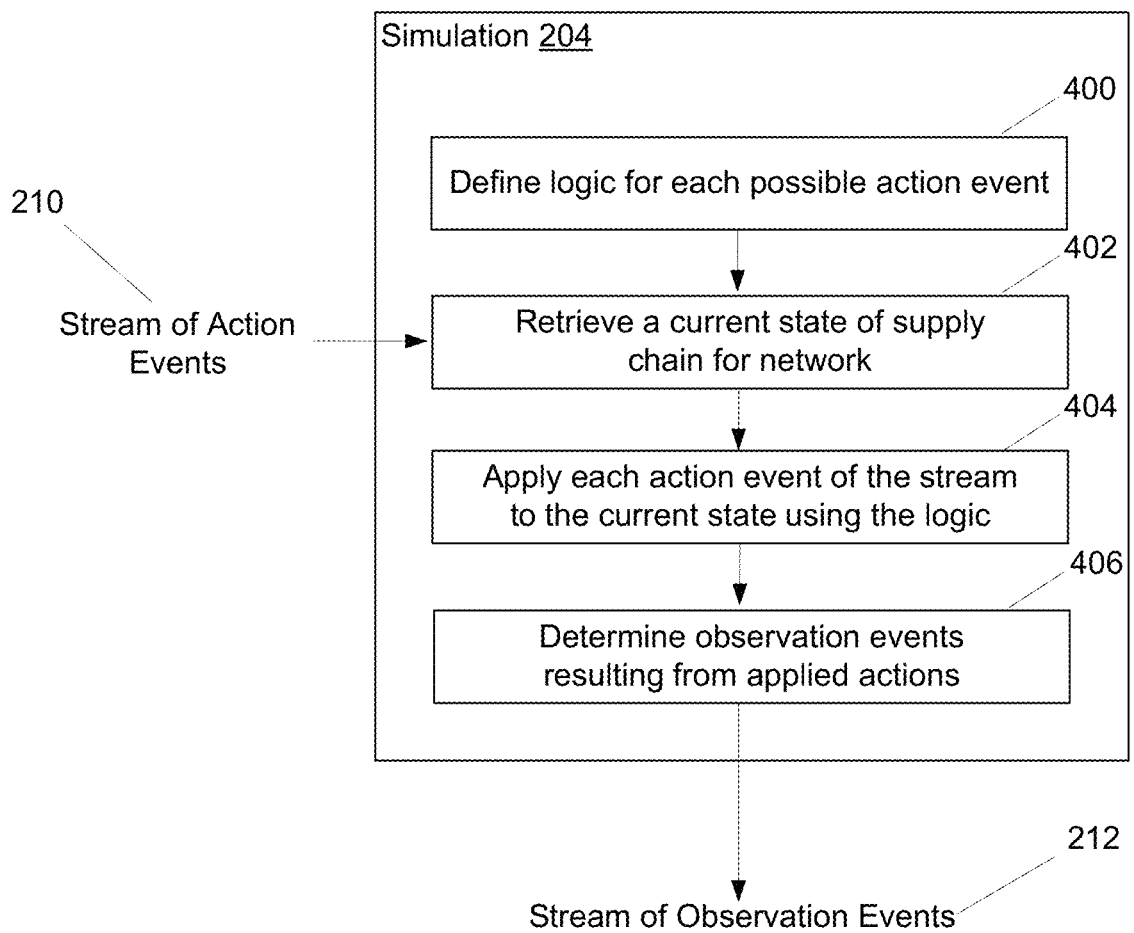
FIG. 4 illustrates an example simulation process performed by the simulation system.

FIG. 4 illustrates an example of the simulation process 204 performed by the simulation system 106. For example, operations 400, 402, 404, and 406 may be performed by the simulation system 106 to yield a stream of observation events 212. At operation 400, logic for each possible action event may be defined. The logic may specify what the simulation system 106 is supposed to do to update a run-state of an enterprise network's supply chain when a particular action event is received. For example, the logic may specify to do "x" to update the run-state when a first type of action event is received, and do "y" to update the state when a second type of action event is received.

In response to receiving the stream of action events 210 output from the data processing 202, a current run-state of the supply chain for the enterprise network may be retrieved at operation 402. Each action event in the stream of action events 210 may be applied to the current run-state retrieved at operation 404 using the logic defined for the respective action at operation 400 (e.g., to update the run-state).

At operation 406, observation events resulting from the applied actions may be determined. Similar to the action events, the observation events may be provided as a stream (e.g., the stream of observation events 212). In some examples, a number of the observation events corresponds to a number of action events 1:1. To provide an example, the first action event in the stream of action events 210 may be a demand action event 326 that indicates 3 units of the item are likely to be sold soon after the node (e.g., a store) opens based on the predicted demand 302. The logic may indicate that the simulation is to create a "sale" observation event for each unit of item at the respective time during the epoch indicated by the demand action event 326, as well as decrement an inventory count by each unit of item sold, in order to update the state when the demand action event 326 is received.

Figure 5A:
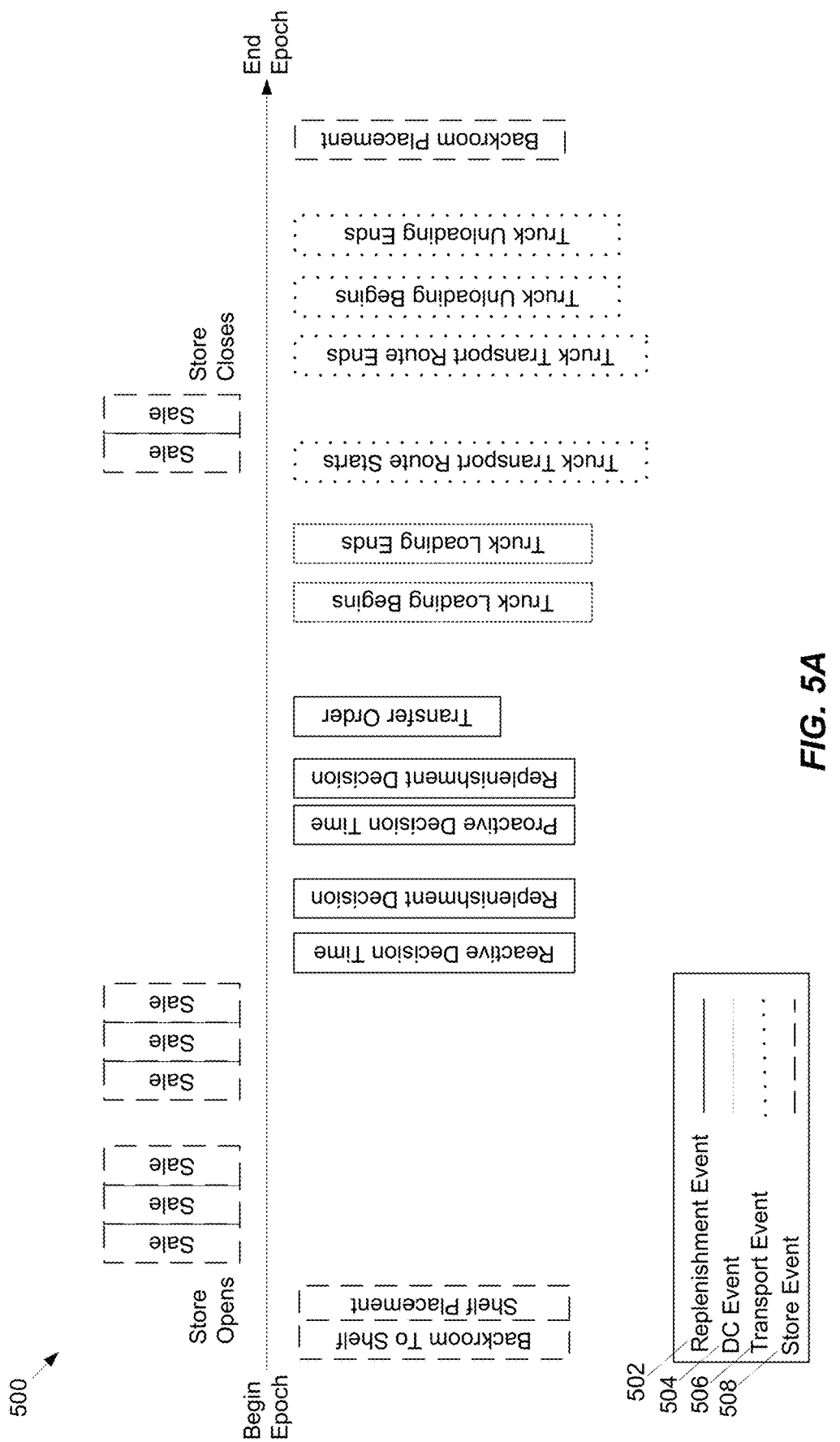
FIG. 5A illustrates an example stream of observation events yielded by the simulation process.
Figure 5B:
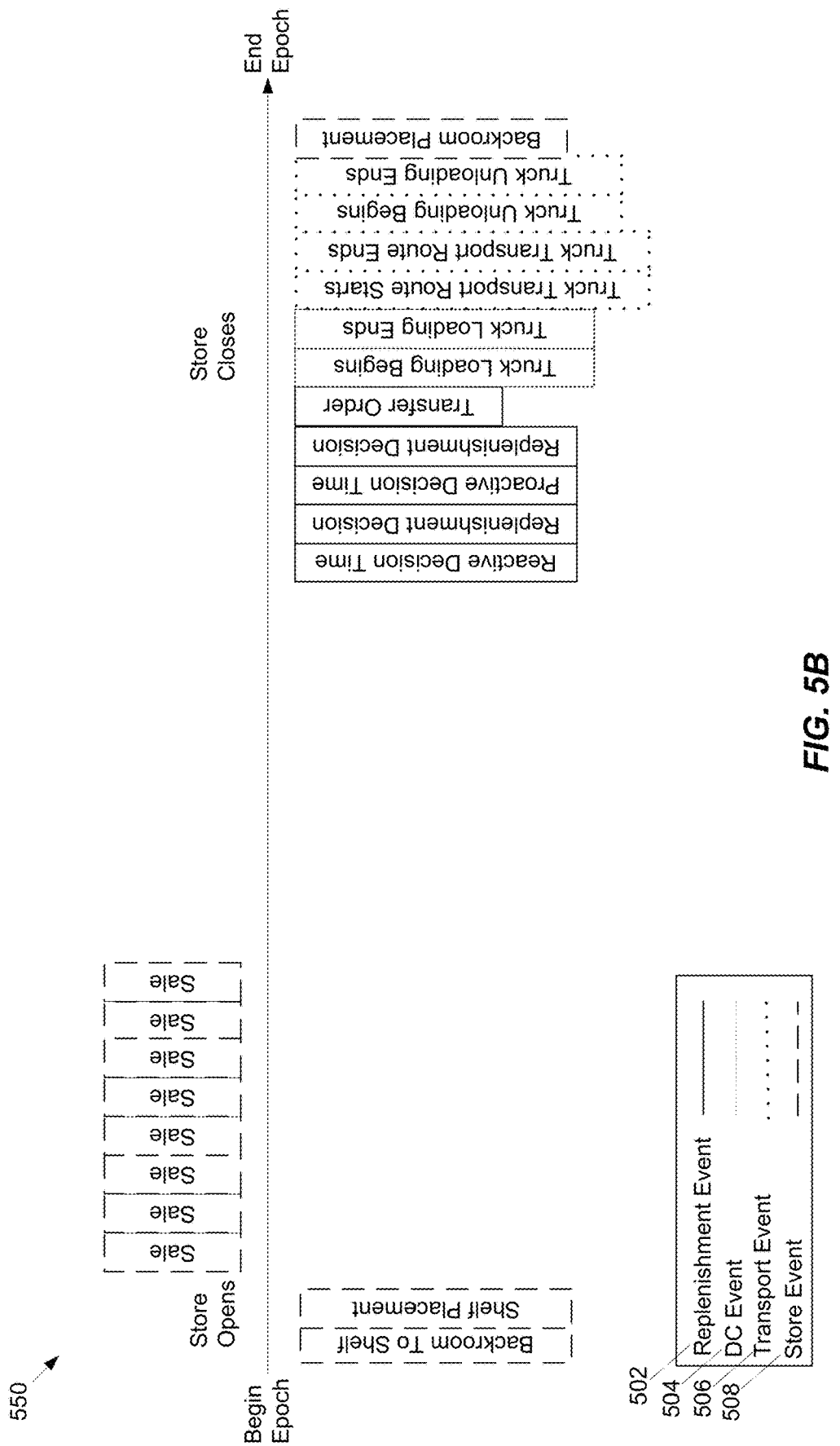
FIG. 5B illustrates a second example stream of observation events yielded by the simulation process.

FIGS. 5A-5B illustrate examples of the stream of observation events 212 yielded by the simulation process 204. In some examples, the stream of observation events 212 is in a form of a timeline 500, as illustrated in FIG. 5A. The timeline 500, displayed along an x-axis, represents an epoch, such as a day from an opening hour of a store at a left most point of the timeline 500 to a closing hour of the store at a right most coordinate of the timeline 500. Display of the timeline 500 along an x-axis is one non-limiting and non-exclusive example. Other displays are possible.

In the example timeline 500, the stream of observation events 212 may include a variety of event types occurring at different points (e.g., nodes or arcs) along the supply chain. For example, a first portion of events may be replenishment events 502. In some examples, the replenishment events 502 may be based on one or more of the policies 306 generated by the policy optimization system 110 that correspond to replenish action events 330, 332 from the stream of action events 210. Some of the replenishment events 502 may be pre-scheduled, proactive events, such as the proactive decision time and subsequent replenishment decision, which correspond to proactive replenish action events 330 based on a proactive policy of the policies 306. For example, the proactive decision time may be a single fixed time of day that the run-state of the supply chain is evaluated based on the proactive policy. The subsequent replenishment decision may be a determined number of units, if any, of the item needed for replenishment at the store based on the evaluation performed at the proactive decision time. This number may be included within the transfer order. Other of the replenishment events 502 may be reactive to other events occurring in the stream of observation events 212, such as the reactive decision time and subsequent replenishment decision, which correspond to reactive replenish action events 332 based on a reactive policy of the policies 306. For example, n items sales events at the store may trigger a reactive decision time, where the run-state of the supply chain may be evaluated. In some examples, n may be a threshold value. The subsequent replenishment decision may be a determined number of units, if any, of the item needed for replenishment at the store based on the evaluation performed at the reactive decision time. This number may be included in the transfer order.

A second portion of events may be distribution center (DC) events 504 occurring at the distribution center from which the store receives the item. In some examples, units of the item are transported via a truck, and the DC events 504 may include a start of a loading of the truck with the item units and an end of the loading of the truck. In other examples, other transportation methods may be used (e.g., aircraft), and similar loading and unloading events may be included.

A third portion of events may be transport events 506 occurring as the item is sent from the distribution center to the store. Example transport events 506 include a start of the transport route, an end of the transport route, a start of an unloading of the truck, and an end of the unloading of the units of the item from the truck. In some examples, one or more of the transport events 506 may correspond to receive shipment action events 328 within the stream of action events 210.

A fourth portion of events may be store events 508 occurring at the store. Example store events 508 include sale of an item, placement of the item on a shelf, placement of the item in the backroom, and movement of the item from the backroom to a shelf. In some examples, one or more of the store events 508 may correspond to demand action events 326 within the stream of action events 210.

In some instances, just as events within a particular epoch are dependent on events occurring within that epoch as well as a current state of the supply chain, events may be based on, or depend from, events occurring in other epochs. For example, in FIG. 5A, a Backroom to Shelf event and a Shelf Placement event (e.g., restocking shelves) are shown as occurring within the given epoch, but may be contingent upon events occurring a prior epoch, such as a trailer arrival and being unloaded into a backroom of a store (e.g., the Truck Transport Route Ends, Truck Unloading Begins, Truck Unloading Ends, and Backroom Placement events as occurring during a preceding epoch).

Referring to FIG. 513 generally, it is noted that in some instances, the simulation systems described herein may be configured such that all events of a given type may be grouped and ordered within an epoch for simplified evaluation. For example, in the timeline 550, all sale events that occur within a particular day will occur at the same time (in this case, once the store opens). However, as noted above, demand for a given product is not only variable in volume for a given day, it is variable in time. For example, a demand input provided may indicate specific times of day (e.g., at a beginning or end of the day) when demand may be higher for a particular item.

It is noted that, even in this case, execution of the simulation 204 may include application of domain logic 304 and/or policies 306 on either a per-epoch basis or in response to each event. Accordingly, action events may be generated in response to all inputs received for a given day, or in response to each individualized input (including input events, logic, etc.) in sequence.

By way of contrast, in a further example timeline 500 seen in FIG. 5A, events may be spread across a given epoch (in the example shown, a day). In this example, sale events are shown as being distributed over the course of the day. The number of sale events in timelines 500, 550 may be the same based on the same demand input, but the sale events in timeline 500 may be placed within the timeline at different locations depending on a desired sales pattern. In one example, the sale events are evenly spread across the portion of the day the store is open. In other examples (such as is shown), the events may be distributed over the course of the day based on a pattern of demand that is provided as an input (e.g., with greater demand early and late in the day for this particular item). Still further, other events, such as distribution center events 504, transport events 506, and/or store events 508 may be generated in response to various logic and/or policies as events occur, in order, during the day.

In comparison of the timelines 500, 550, it is noted that the selection of which manner in which a simulation is executed may have some effect not only on overall computational complexity (e.g., assessing events and item movements once per epoch, rather than in response to each event) but also with respect to accuracy at that particular node in a supply chain and throughout the supply chain. For example, in both example timelines, the same number of sales may occur on a given day. However, because reorder events (e.g., the transfer orders as shown) might occur earlier in the day in the case of timeline 500, the timing of transport of new items may differ, and therefore, a number of stockouts may also differ. At other nodes within a given supply chain simulation, the earlier transfer order received at a distribution center to replenish stock at a store may change logic that is executed for that distribution center (e.g., to reallocate stock of the item differently across all stores). Other variations may occur as well. Accordingly, a user selection to evaluate the simulation on a per-epoch basis or on a per-event basis may result in a tradeoff between accuracy and computational complexity.

Still further, in the context of either timeline of FIGS. 5A-5B, because certain inputs or execution characteristics are non-deterministic but must be selected to be discrete values at the time of simulation, in some example embodiments, each epoch may be configured for execution for a number of iterations. Each iteration may select a particular value independently of other iterations, but within the range of possible values for that particular input or execution parameter. For example, although in both FIGS. 5A-5B, eight sale events are shown for a particular item in a given day (the selected epoch), an input may reflect a demand distribution in which a range of items may be sold (e.g., 8+/−2 sales, with sales being more likely in morning and evening hours). Accordingly, if a plurality of iterations of a given epoch are executed, varying numbers of sales may be used in the different iterations (e.g., values in the range of six to ten sales, weighted toward a most-likely value, and distributed within a given timeline 500 at a most likely time of day).

Accordingly, and given the variety of types of configurations that are provided by the simulation system described herein, prior to execution of a simulation, a user may select the granularity of simulation events that are used in a given execution, a number of epochs for the simulation, a specific product or products associated with the simulation, as well as a number of iterations of the same epoch that is simulated to obtain a range of simulated results that corresponds to the range of non-deterministic inputs and simulation characteristics.

Figure 6:
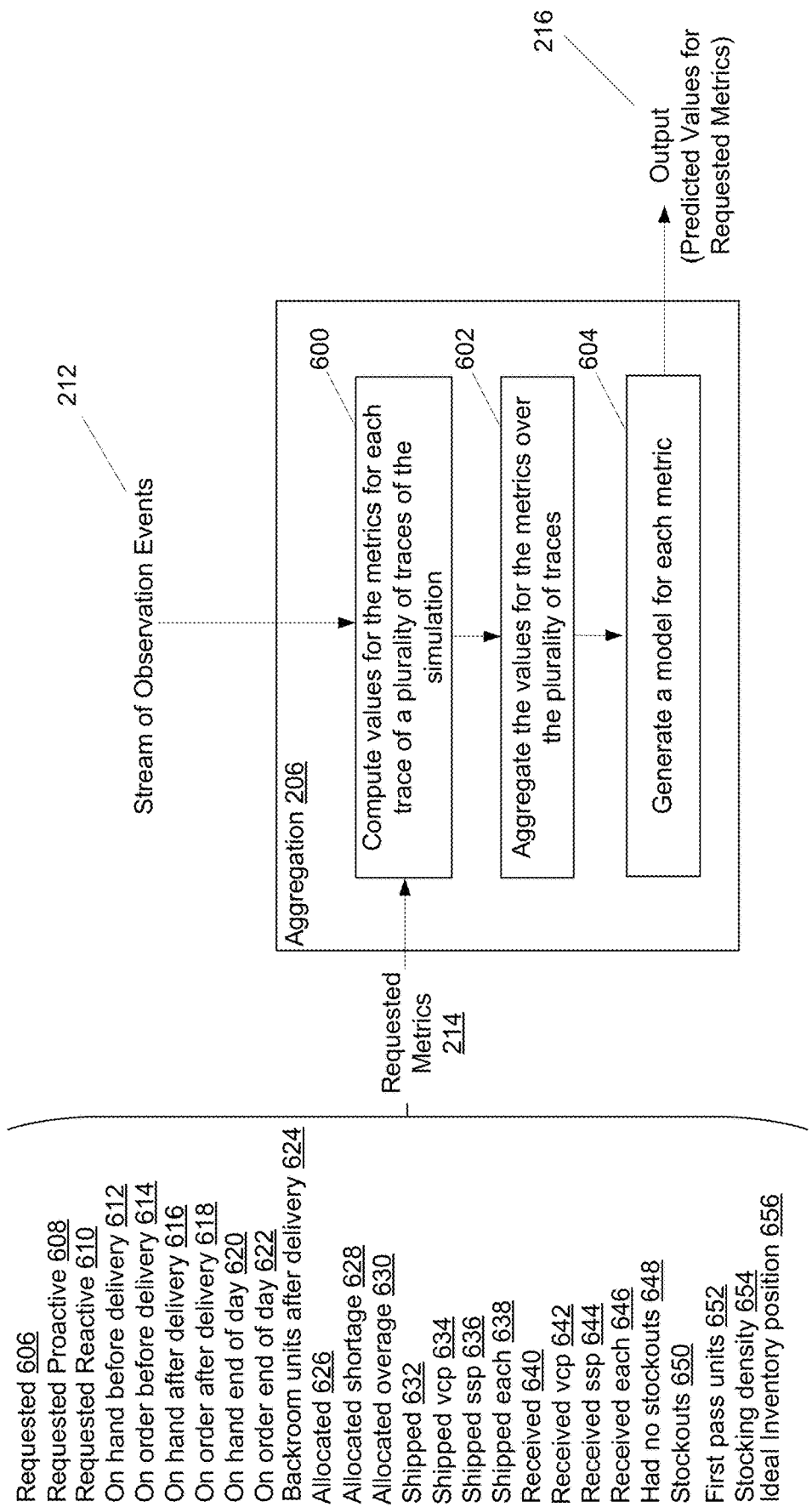
FIG. 6 illustrates an example aggregation process performed by the simulation system.

FIG. 6 illustrates an example of the aggregation process 206 performed by the simulation system 106, useable after events are generated from the simulation process 204. One or more requested metrics 214 and the stream of observation events 212 yielded from the simulation process 204 may be received as input. During the aggregation process 206, operations 600, 602, and 604 may be performed by the simulation system 106 to transform the stream of observation events 212 to determine predicted values corresponding to the requested metrics 214 for provision as output 216.

In some examples, the stream of observation events 212 output from the simulation process 204 may represent a single trace of a plurality of traces run by the simulation. To transform the stream of observation events 212, values for the requested metrics 214 may be computed for the trace based on an analysis of events within the stream of observation events 212 at operation 600. This transformation is repeated for each trace of the plurality of traces, and at operation 602, the values for the requested metrics 214 computed for each trace may be aggregated over the plurality of traces. This may occur over multiple iterations within the same epoch, or over a plurality of epochs, or both, depending on the configuration of the simulation executed.

At operation 604, a model may be generated for each of the requested metrics 214 based on the aggregation performed at operation 604. The model generated is a statistical model including univariate statistics, such as a mean value for the metric, a standard deviation value for the metric, a minimum value for the metric, and a maximum value for the metric across the plurality of traces, and samples. The samples may include a list of values for the metric in the first n traces that were run. In one example, n may be three traces. The list of values may correspond across the requested metrics 214. For some types of simulation, such as a first mile simulation, a complete model may not be generated. Based on the nature of the model, numerical values corresponding to the requested metrics 214 that are provided as the output 216 can be univariate statistics.

The requested metrics 214 may be related to inventory and changes thereto over an epoch, or over a plurality of epochs (or an average per-epoch value across a plurality of epochs). For example, the requested metrics 214 can include one or more of the following metrics, each described in turn below: requested 606, requested proactive 608, requested reactive 610, on hand before delivery 612, on order before delivery 614, on hand after delivery 616, on order after delivery 618, on hand end of day 620, on order end of day 622, backroom units after delivery 624, allocated 626, allocated shortage 628, allocated overage 630, shipped 632, shipped vcp 634, shipped ssp 636, shipped each 638, received 640, received vcp 642, received ssp 644, received each 646, had no stockouts 648, stockouts 650, first pass units 652, stocking density 654, and ideal inventory position 656. "Need" as used throughout the following descriptions of the requested metrics 214 means a number of units a node needs to bring inventory level of the product up to meet the order-up-to-level (OTL), where OTL is a number of units that should be on hand at a node at a beginning of an epoch. For purposes of the following descriptions, an epoch is defined as a day.

Requested 606 represents a number of units that were requested of the node. If the node is a distribution center, requested 606 may represent a total need from all children nodes for that particular day (e.g., a number of units needed to bring inventory level of the product up to meet the OTL for all stores that receive the product from the distribution center). If the node is a store, requested 606 may represent a total sales demand for that particular day at the store. To provide an example, a network may have one distribution center with three stores. Each of the three stores has an OTL of 4 units and currently has 2 units on hand, and thus each of the three stores needs 2 units to meet the OTL. Simulated sales demand at each store is 2 units. Therefore, for the one distribution center, requested 606 is 6 (need=2+2+2), and for each of three stores, requested 606 is 2 (sales demand=2).

Requested proactive 608 represents a number of units that were requested of the node during a proactive policy evaluation before any sales or item movements occur (e.g., at start of an epoch, such as beginning of the day). If the node is a distribution center, the requested proactive 608 may be the sum of all children nodes' need from proactive policy evaluation (e.g., a number of units needed to bring inventory level of the product up to meet the OTL for all stores that receive the product from the distribution center at the beginning of the day). Stores may not undergo a proactive policy evaluation, and thus if the node is a store, the value for requested proactive 608 may be 0 units. To provide an example, if the proactive policy evaluation at start of an epoch generates a need of 4 units for a sole child store of a distribution center, the requested proactive 608 will be 4 units for the distribution center and 0 units for the store.

Requested reactive 610 represents a total need generated from policy evaluations as item sales occur throughout the epoch for a node's children. In some examples, if the node is a distribution center, only certain types of distribution centers, such as flow center nodes with a reactive replenishment flag in an associated configuration file may have a value for this metric. Otherwise, distribution centers may have a value of 0 units for the requested reactive 610. If the distribution center does have a value for this metric, the sum of values for the requested proactive 608 and the requested reactive 610 may equal the value for requested 606. If the node is a store, the requested reactive 610 may be a number of units to replenish units of the item that are sold at the store throughout the epoch (e.g., a one-for-one replenishment of item units sold at the store throughout the day). However, for stores, because value for the requested proactive 608 is 0 units, the values of the requested 606 and the requested reactive 610 are equal. To provide an example scenario, a child store is replenished reactively by its parent flow center. The flow center has 2 units on hand, the store has an OTL of 10 units, and 4 units on hand. Therefore, during a proactive replenishment, the store requests 6 units, but only 2 units are allocated such that the store now has 6 units on hand. Now, the store sells 1 unit throughout the day and therefore has 5 units on hand during reactive evaluation. The requested reactive 610 is then (5−(6−2))=1, so only 1 unit is requested specifically due to reactive replenishment.

On hand before delivery 612 represents a total number of item units on hand at the node at the start of the day, before any demand (e.g., sales) and before any deliveries has occurred. On order before delivery 614 represents a total number of item units on order for the node at the start of the day, before any demand (e.g., sales) and before any deliveries has occurred. On hand after delivery 616 represents a total number of item units on hand at the node after delivery. On order after delivery 618 represents a total number of item units on order for the node at the node after delivery. In some examples, if there is only one truck delivery during the day, then the summation of on hand before delivery 612 and on order before delivery 614 equals the summation of on hand after delivery 616 and on order after delivery 618 (e.g., because on order after delivery 618 is 0 units as there is only one truck delivery for the day).

On hand end of day 620 represents a total number of item units on hand at the node at the end of the day, after the demand for the day is done (e.g., after store has closed and no more items can be sold) and after deliveries have likely arrived. If there are no further deliveries received, and thus no overnight changes from the end of the day to a next day, then the on hand end of day 620 for the day is equal to the on hand before delivery 612 for the next day.

On order end of day 622 represents a total number of item units on order for the node at the end of the day, after the demand for the day is done (e.g., after store has closed and no more items can be sold) and after deliveries have likely arrived. If there are no further deliveries received, and thus no overnight changes from the end of the day to a next day, then the on order end of day 622 for the day is equal to the on order before delivery 614 for the next day.

Backroom units after delivery 624 represent a maximum number of units over the course of the day that did not fit on the shelf at the store. Based on the shelf capacity (e.g., a number of units that can fit on the shelf at one time) and assuming one delivery occurs at the beginning of the day, the backroom units after delivery 624 is equal to max(0, x), where x is the difference between on hand after delivery 616 and the shelf capacity. Items that do not have shelf capacity defined (e.g., non-POG items) are treated as always fitting on the shelf, and thus the value for backroom units after delivery 624 is 0 units. Similarly, if the node is a distribution center, rather than a store, than the value for the backroom units after delivery 624 is 0 units.

Allocated 626 represents a total number of units allocated at a distribution center. Thus, if the node is a store, the value may be 0 units. Assuming daily shipments and all units fit on a truck, the values for allocated 626 and shipped 632 are equal. Allocated shortage 628 represents a total number of units allocated at a distribution center during shortage allocation, which may be defined by a difference between the values for requested 606 and unfilled demand described below. Allocated overage 630 represents a total number of units allocated at a distribution center during overage allocation. The summation of values for allocated shortage 628 and allocated overage 630 yield the value for allocated 626.

Shipped 632 represents a total number of units that are shipped from a node. If the node is a distribution center, shipped 632 includes that total number of units shipped from the distribution center to children stores. To provide an example, if the distribution center ships 10 units to various stores during a day, then the value for shipped 632 is 10 units for the day. If the node is a store, shipped 632 is the fulfilled sales demand (e.g., a total number of units sold at the store for the day).

Shipped vcp 634 represents a number of vendor case packs (VCPs) shipped from a node, particularly a distribution center. To provide an example, if the vendor case pack size is 6 (e.g., 6 units of the item are included within 1 pack), and value for shipped 632 is 13 units then shipped vcp is 2 VCPs. In other words, 2 VCPs are shipped from the distribution center. Stores do not sell in VCPs, rather individual units of the item, so if the node is a store, then the value for shipped vcp 634 may be 0. Shipped ssp 636 represents a number of store ship packs (SSPs) shipped from a node, particularly a distribution center. Stores do not sell in SSPs, rather individual units of the item, so if the node is a store, then the value for shipped ssp 636 may be 0. Shipped each 638 represented a number of eaches (e.g., a number of individual units of the item) shipped from the node. If the node is a store, values for shipped each 638 and shipped 632 are equal. If the node if a store, values for shipped each 638 are a number of VCPs or a number SSPs multiplied by the number of units within each VCP or SSP, respectively.

Received 640 represents a total number of units that a child node (e.g., a store) receives on an epoch from their parent node (e.g., a distribution center) that was shipped a lead time earlier. For example, if the distribution center has a lead time of one day to ship an item to its child store, and it ships 10 units on day 1, then the store will have received 10 units on day 2. Thus, a summation of values for received 640 for each child node on a day plus lead time equals a value of shipped 632 for the parent node on the day. Additionally, if there is only one truck delivery in the morning, then the value of on hand after delivery 616 equals a summation of values for on hand before delivery 612 and received 640. Additionally, the value of on order after delivery 618 equals a difference between on order before delivery 614 and received 640.

Received vcp 642 represents a number of VCPs received at a node. Received ssp 644 represents a number of SSPs received at a node. Received each 646 represents a number of individual units of items received at a node. Determining received vcp 642, received ssp 644, and received each 646 is analogous to determining shipped vcp 634, shipped ssp 636, and shipped each 638, respectively.

Had no stockouts 648 is a metric that represents the probability of covering all demand in a given epoch, and is a Boolean value of 0 or 1. A value of 0 signifies that 100% of the demand (e.g., a value for requested 606) is likely to be satisfied based on the number of units on hand. A value of 1 represents an observation where a number of units was not greater than or equal to the demand (e.g., the value for requested 606), and thus there is unfulfilled demand.

Stockouts 650 is a metric that represents whether there was a stockout of the item in a given epoch, and is a Boolean value of 0 or 1. A value of 0 indicates there was not a stockout, where a value of 1 indicates there was a stockout. A stockout occurs when the number of units on hand for an item is less than or equal to 0 units. Presence or absence of a stockout signifies whether the node had enough units on hand to cover potential demand.

By determining stockouts 650 across all eligible nodes for an item, a user can calculate a type 1 service level (e.g., an out-of-stock percentage (OOS %)), by taking the mean of stockouts 650 for all nodes an item is eligible in. To provide an example, an item may be eligible in 3 nodes, each having three traces run by the simulation. The stockouts 650 for each node and trace are shown in the table below, along with a trace mean (e.g., a mean of stockouts for each trace across all three nodes) and a node mean (e.g., a mean of stockouts 650 for each node across all three traces). The node mean is also referred to as a stockouts mean.

| Node | Trace 1 | Trace 2 | Trace 3 | Node Mean |
|---|---|---|---|---|
| 2223 | 0 | 1 | 0 | 0.333 |
| 3204 | 0 | 0 | 1 | 0.333 |
| 3 | 1 | 1 | 1 | 1.0 |
| Trace Mean | 0.333 | 0.666 | 0.666 | |

To calculate OOS % for an item across all nodes, the stockouts mean is aggregated at the item-date level across the nodes, and a mean is calculated from the aggregated date. This mean value represents the percentage of nodes in which this item was out-of-stock. Utilizing the data from the table per the example above, this would give an OOS %=(0.333+0.333+1.0)/3=0.555 for this item; which signifies that 55% of the nodes for this item had a number of units on hand less than or equal to 0 for the given epoch.

First pass units 652 represents a number of units delivered to a node, particularly a store, that are immediately put on the shelf. To provide an example, if the number of units on hand before delivery is 3, and 5 units are received, but the shelf capacity is only 6, then first pass units 652 would be 3 (e.g., first pass units 652=min(max(0, shelf capacity−on hand before delivery 612), received 630)). Items that do not have shelf capacity defined (e.g., non-POG items) are treated as always fitting on the shelf, and a value for first pass units 652 for such items is equal to a value for received 640. If the node is a distribution center the value for first pass units 652 may be 0 units. A summation of the values for first pass units 652 and backroom units after delivery 624 may equal a value for received 640.

Stocking density 654 is a metric similar to first pass units 652, however statistics are only collected when the value is non-zero. In other words, days when there are no deliveries do not affect the mean, standard deviation, etc. of the calculation.

Ideal inventory position 656 represents an inventory (e.g., a number of units of an item) that a node needs to have on hand in order to fulfill all requests (e.g., demand) until the next order that it can make arrives. The ideal inventory position 656 may be particularly helpful to determine on order days. To provide an example, if the order day is Monday, the next order day is Wednesday, and the lead time is two days meaning that the next order placed on Wednesday would arrive on Friday, then the ideal inventory position 656 is a sum of all the requests that are going to happen (e.g., the sum of all demand) between Tuesday and Thursday, assuming that the order is received on Friday before demand occurs, and Monday is skipped because ordering happens at end of day.

In some examples, the requested metrics 214 received as input may be based on a type of the simulation being run. For example, if the simulation is a first mile simulation (e.g., a pre-optimization simulation), the requested metrics 214 received as input may include one or more of requested 606, on hand before delivery 612, shipped 632, received 640, stockouts 650, and ideal inventory position 656.

In other examples, the requested metrics 214 received as input may be based on a subsequent process for which the output 216 (e.g., predicted values for the requested metrics 214) is to be provided as input. As one example, the output 216 may be utilized to facilitate sales and operations planning (S&OP) volume predictions. These volume predictions may facilitate labor planning such as a how many employees are needed to work on a particular day at a particular node. Examples of the requested metrics 214 received as input when the output 216 is facilitating S&OP volume predictions may include requested 606, requested proactive 608, requested reactive 610, on hand before delivery 612, shipped 632, received 640, and stockouts 650.

As an additional example, the output 216 may be utilized to facilitate analysis and validation of optimization processes. For example, the policies received as input to the simulation system may be frequently updated by the policy optimization system to adjust existing policies and/or add new policies. The output 216 may be used to determine whether the policies should be rolled back to the former state (e.g., prior to the last update). Examples of the requested metrics 214 received as input when the output 216 is facilitating analysis and validation of optimization processes may include all of the above-described metrics except ideal inventory position 656.

As a further example, at least some portions of the output 216 (e.g., some of the values for the requested metrics 214) may be utilized post processing to compute additional metrics not directly output by the simulation system 106. For example, a fill rate or a type 2 service level (e.g., unfilled demand) for a node can be determined based on a difference between values for requested 606 and shipped 632 metrics that are output by the simulation system 106. If the node is a store, the unfilled demand may be a total number of units of missed demand. If the node is a distribution center, the unfilled demand may be a number of units requested of the distribution center that could not be fulfilled due to sufficient inventory.

The example requested metrics 214 described above are non-limiting and non-exhaustive examples. Other types of metrics related to inventory and how inventory changes over time may be included within the requested metrics 214.

The data processing 202, simulation 204, and aggregation 206 processes as described in detail with reference to FIG. 3, FIG. 4 and FIG. 6, respectively, are performed on a per epoch basis to predict values for requested metrics for the respective epoch with regard to a single item at a single node of the network. The data processing 202, simulation 204, and aggregation 206 processes may be repeated for a plurality of epochs with regard to the same item at the same node of the network, resulting in predicted values for requested metrics for the plurality of epochs. Additionally, the data processing 202, simulation 204, and aggregation 206 processes may be repeated for each of a plurality of items at the same node for the plurality of epochs, and for each of a plurality of nodes of the network. Resultantly, a future-state of the supply chain may be generated that represents the plurality of nodes of the network and the plurality of items at each node for the plurality of epochs. The future-state of the supply chain may be analyzed or otherwise implemented to facilitate supply chain management decisions. In some examples, to enable easier user consumption of the future-state of the supply chain during analysis, the predicted values may be provided for display at various levels of granularity allowing a user to select which item and node(s) to display, as described in greater detail below with reference to FIGS. 8-10.

Figure 7:
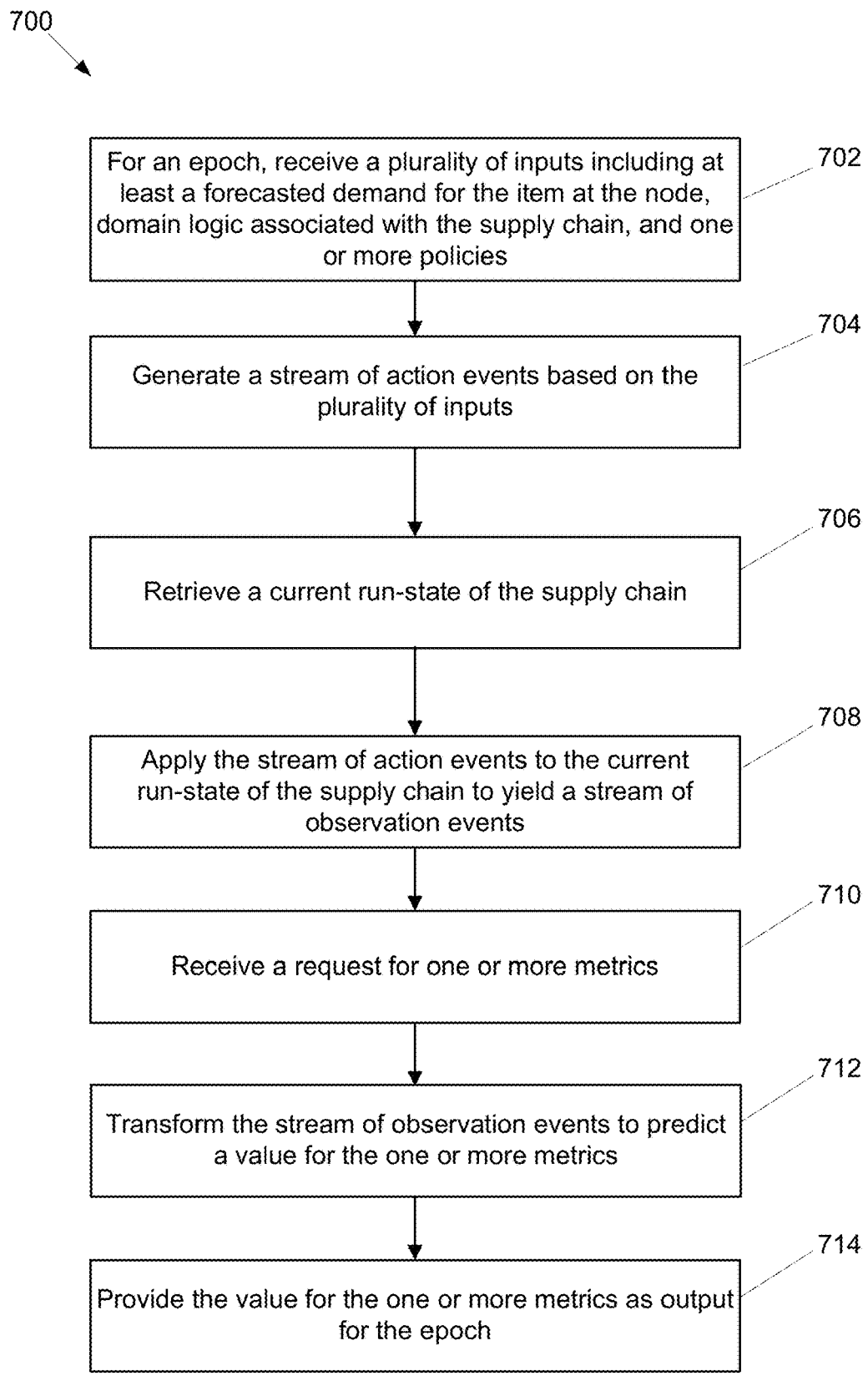
FIG. 7 illustrates an example method for simulating supply chain replenishment.

FIG. 7 illustrates an example method 700 for simulating a per epoch run-state of a supply chain for an item at a node of a network. In some examples, the method 700 may be performed by the simulation system 106 described in detail with reference to FIG. 1.

The method 700 begins at operation 702, where for an epoch, a plurality of inputs may be received. In some examples, the epoch may be a day that has not yet occurred (e.g., day in the future), where the day may be particularly defined by open to close hours of the node. The plurality of inputs may include at least a forecasted demand (or demand distribution) for the item at the node, a domain logic associated with the supply chain, and one or more policies. The plurality of inputs may also include known, external inputs, such as weather, incentive programs, and the date corresponding to the epoch.

At operation 704, a stream of action events may be generated based on the plurality of inputs. For example, a plurality of action events may be determined based on the plurality of inputs, and the plurality of action events may be merged (e.g., using multiplexing techniques) to generate the stream of action events. At operation 706, a current run-state of the supply chain may be retrieved.

At operation 708, the stream of action events generated at operation 704 may be applied to the current run-state of the supply chain retrieved at operation 706 to yield a stream of observation events. For example, prior to or in conjunction with the generation of the stream of action events, logic for updating a run-state of the supply chain may be determined for each possible type of action event based on the respective action event. Therefore, when the stream of action events are generated, a type of each action event within the stream of action events may be determined and respective logic for each action event within the stream of action events may be applied to the current run-state of the supply chain.

At operation 710, a request may be received for one or more metrics. In some examples, the requested metrics may be based on a type of simulation being run and/or a subsequent process to which values of the requested metrics are provided as input. A non-exhaustive and non-exclusive list of example metrics are described in detail with reference to FIG. 6.

At operation 712, the stream of observation events yielded by operation 708 may be transformed to predict a value for the one or more metrics. In some examples, the transformation includes generating a model for each of the one or more metrics. Some of the inputs received at operation 702, such as forecasted demand and certain aspects of the supply chain domain logic (e.g., lead times), represent random processes that are sources of uncertainty in predicting values for the metrics. Therefore, to better assess and remove uncertainty, a plurality of traces may be produced (e.g., by repeatedly running operations 702, 704, 706, and 708). A model for a respective metric may be generated based on values for the respective metric computed over the plurality of traces. For example, a value for the metric is predicted for each trace, values of the metric for each of the plurality of traces are aggregated, and the model is generated based on the aggregation.

At operation 714, the predicted value for the one or more metrics may be provided as output for the epoch. In some examples, the output is provided for display in one or more of a graphical and tabular format. In other examples, the output is provided as at least a portion of a report.

In example embodiments, portions of the method may be performed iteratively to accommodate non-deterministic or stochastic inputs or execution characteristics of the simulation model. For example, operations 702-708 may be performed a user-selectable or predetermined number of times per epoch, with different discrete values selected for each non-deterministic value in each iteration. In some examples, up to one hundred or more iterations may be performed to obtain statistically representative metrics.

In some examples, operations 702 to 714 may be performed for each of a plurality of epochs, resulting in predicted values for the one or more metrics for the plurality of epochs. As one example, the operations 702 to 714 may be performed for the next 105 days. Additionally, operations 702 to 714 may be performed for each of a plurality of items at the node for the plurality of epochs, and for each of a plurality of nodes of the network. Resultantly, a future-state of the supply chain may be generated that represents the plurality of nodes of the network and the plurality of items at each node for the plurality of epochs. The future-state of the supply chain may be analyzed or otherwise implemented to facilitate supply chain management decisions.

The operations 702 to 714 are included for illustration purposes. Event-based simulations for supply chain replenishment may be implemented by similar processes with fewer or additional operations, as well as in different order of operations using the principles described herein. The operations described herein may be executed by one or more processors operated on one or more computing devices, one or more processor cores, and/or specialized processing devices, among other examples.

Figure 8:
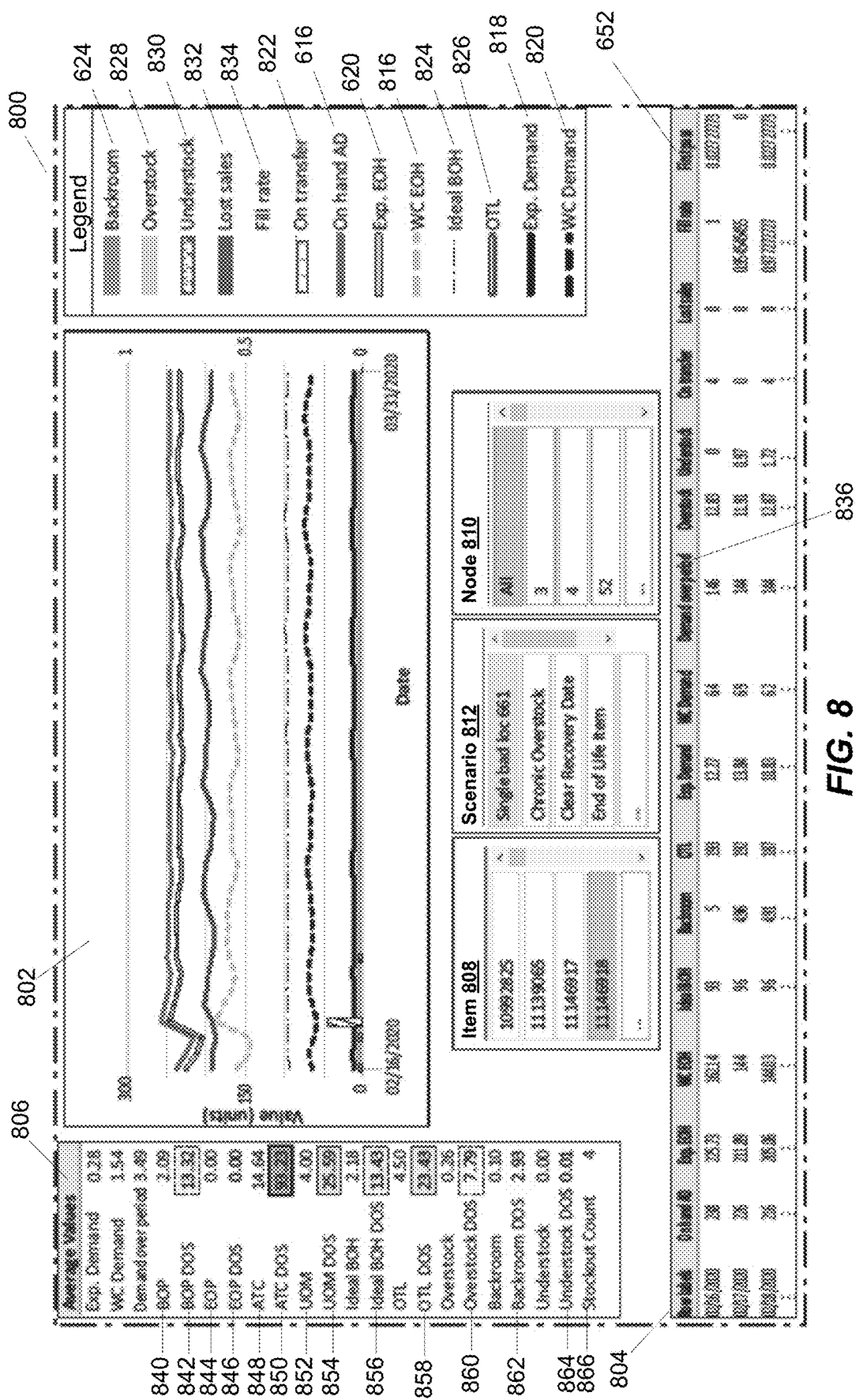
FIG. 8 illustrates an example user interface for displaying metrics associated with a simulation at a first level of granularity.

FIG. 8 illustrates an example user interface 800 displaying metrics associated with a simulation at a first level of granularity. Some of the metrics displayed may be associated with output 216 from the simulation system 106. As described in detail with respect to FIG. 6, the output 216 are predicted values corresponding to the requested metrics 214. Additional metrics and values thereof not directly output by the aggregation process 206, but computed post-processing based on the output 216 may also be displayed. Other of the metrics displayed may be associated with inputs 208 from the simulation system 106. As described in detail with respect to FIG. 3, the inputs 208 can include external inputs 300, predicted demand 302, domain logic 304 and policies 306.

The user interface 800 may include a graphical view 802, a tabular view 804, and a list view 806 for displaying various subsets of the metrics and values thereof based on a selected level of granularity for viewing the metrics over a specified number or range of epochs, also referred to herein as an active selection. The specified number or range may be at least a portion of the number of epochs run by the simulation. In some examples, the specified number or range of epochs is a default value (e.g., a next forty-five days, as illustrated). In other examples, the specified range of epochs can be defined independently or adjusted from the default value as part of the level of granularity selected (e.g., extended to a next 100 days).

A user, such as an inventory management data analyst, is enabled to select the level of granularity at which data is displayed within the user interface 800 (e.g., within the graphical view 802, tabular view 804, and list view 806) by selecting at least one or more items from an item menu 808 and one or more nodes from a node menu 810, respectively. The item menu 808 may include a list of selectable items associated with the supply chain network (e.g., all items that move across nodes of the network, such as from at least one distribution center to at least one store). The selectable items may be displayed within the list based on an identification number or other example identifier for the item. More than one item may be selected from the item menu 808 at a time. Additionally, the list may include a selectable option of "All" to enable the user to efficiently select all items with one selection, rather than having to individually select each item from the list. The node menu 810 may include a list of selectable nodes of the supply chain network (e.g., stores or distribution centers of the network). The selectable nodes may be displayed within the list based on an identification number or other example identifier for the node. Additionally, the list may include a selectable option of "All" to enable the user to efficiently select all nodes with one selection, rather than having to individually select each node from the list. As illustrated in FIG. 8, the user selects one item (e.g., with identifier 1114698) from the item menu 808 and all nodes from the node menu 810.

In some examples, the item menu 808 and the node menu 810 may be drop down menus. For example, the user can hover over, click on, or provide other similar input to activate the drop down menus causing the list of selectable items and the list of selectable nodes to be displayed in the respective item menu 808 and the node menu 810 upon activation. Depending on a length of the lists (e.g., a number of items and nodes), the menus 808, 810 may include scrolling functionalities to preserve display space.

In some examples, if the user first selects one or more items from the item menu 808, the list of selectable nodes displayed in the node menu 810 may be updated to exclude any nodes that are not associated with the selected items. Accordingly, the list when updated may only be comprised of distribution centers that provide the selected items to stores and/or stores that stock the selected items, for example. Similarly, if the user first selects one or more nodes from the node menu 810, the list of selectable items displayed in the item menu 808 may be updated to exclude any items that are not associated with the selected nodes. Accordingly, the list when updated may only be comprised of items that are either provided by any selected distribution centers to stores and/or stocked by any selected stores, for example.

Although not illustrated in FIG. 8, additional menus or filters may be displayed in the user interface 800 to enable the user to further refine the level of granularity at which they wish to view the metrics. As one example, filters associated with a hierarchy utilized by the enterprise to organize inventory items may be provided. The filters may be associated with (e.g., may be a feature of) the item menu 808 or may be a separate menu. The filters may include one or more of department, class, subclass and style filters. Therefore, the user can easily apply a class filter with one action to select all items within a same class for viewing the metrics, for example, rather than having to make individual selections of every item corresponding to that class in the item menu 808. As another example, filters associated with parent and root nodes of the enterprise's supply chain network may be provided. The filters may be associated with (e.g., may be a feature of) the node menu 810 or may be a separate menu. A parent node may represent a distribution center and root nodes of that parent node may represent stores that receive items from the distribution center. Therefore, the user can easily apply a parent-root node filter with one action to select a distribution center and all stores associated with the distribution center, for example, rather than having to make individual selections of each corresponding node in the node menu 810. As a further example, grouping filters that allow the user to view shared groups of items and nodes may be provided.

Additionally, as shown in FIG. 8, the user interface 800 may include a scenario menu 812. The scenario menu 812 may include a list of selectable scenarios (e.g., attributes) associated with items at the nodes. Non-limiting and non-exhaustive examples of the scenarios include end of life item, single bad location, chronic overstock, clear recovery date, large or very large units of merchandise (UOM), and persistent backroom, among other similar scenarios. In some examples, a scenario may be automatically selected based on the selected items from the item menu 808 and/or selected nodes from the node menu 810. For example, if a selected item is on clearance within the range of epochs, end of life item may be automatically selected from the scenario menu 812. In another example, and as illustrated in FIG. 8, single bad location may be automatically selected from the scenario menu 812 if the inventory for the selected item is not optimized at one of the nodes associated with the selected item. Additionally, the single bad location selection may be annotated within the scenario menu 812 to identify the particular node that is not optimized, such as node 661, where 661 is the identification number for the node. In other examples, the user can select one or more scenarios from the scenario menu 812.

Additionally, or as an alternative to the scenario menu 812, an alert filter or menu may be provided for display in the user interface 800. The alert filter may allow the user to view particular items and/or nodes that were flagged based on post-simulation analysis. The items and/or nodes may be flagged due to metrics indicating lack of inventory optimization. In some examples, similar to the scenario menu 812, the alert filter may allow the user to select which of the problematic items or nodes to view metrics for based on a type of issue causing lack of inventory optimization (e.g., chronic overstock vs. large UOM). Upon selection of an issue type, the corresponding items and nodes having the issue type may be automatically selected.

The items and nodes selected through the various menus and/or filter may correspond to a level of granularity for viewing the metrics. For example, the selected one item (e.g., with identifier 1114698) at all nodes within the item menu 808 and node menu 810, respectively, corresponds to a first level of granularity. In addition to retrieving inputs 208 from the simulation, predicted values for metrics associated with the output 216 (e.g., predicted values for the requested metrics 214 and additional metrics computed post-processing) corresponding to the level of granularity may be retrieved from a database. As discussed previously with reference to FIG. 6, the types of metrics may vary based on a type of simulation being run and/or a subsequent process for which the output 216 is to be provided as input (e.g., purchasing decisions, S&OP volume predictions, or analysis and validation of optimization processes). In some examples, the database is associated with the simulation system 106 or service 102. In other examples, the database is hosted by a third party service.

The predicted values of the requested metrics 214 and additional post-processing computed metrics are received on a per item, per node, per epoch basis at the database. In some examples, the predicted values for the metrics can be enhanced using basic calculations (e.g., sum, average, standard deviation, maximum, minimum) prior to storage within the database. The metrics may be stored according to an index within the database. For example, the predicted values for the metrics may be indexed based on a type of metric the value represents (e.g., on hand after delivery 616, on hand end of day 620, etc.), an identifier for the item, an identifier for the node, and an identifier for the epoch. Resultantly, upon receiving the selection of the one item at all nodes, the index can be utilized to retrieve predicted values for each type of metric for the one item at all nodes for each epoch within the range (e.g., each day for the next forty-five days).

The predicted values for each of the metric types can then be aggregated per epoch across the selected nodes to yield per epoch aggregated values for each metric. For example, the predicted values for on hand after delivery 616 of the first item at each node on a first day of the next forty-five days are aggregated (e.g., summed), the predicted values for on hand after delivery 616 of the first item at each node on a second day of the next forty-five days are aggregated, and so on for each of the next forty-five days. Similarly, the predicted values for on hand end of day 620 of the first item at each node on a first day of the next forty-five days are aggregated, the predicted values for on hand end of day 620 of the first item at each node on a second day of the next forty-five days are aggregated, and so on for each of the next forty-five days.

The per epoch aggregated values for at least a portion of the metrics (e.g., a first subset of the metrics) over at least a portion of the plurality of epochs may be visually represented in the graphical view 802. An x-axis of the graphical view 802 may represent dates corresponding to the epochs (e.g., the next forty-five days). A primary y-axis of the graphical view 802 may represent the per epoch aggregated value measured in units of the item. In some examples, the graphical view 802 may include a secondary y-axis, depending on the values of the first subset of metrics. For example, for some of the metrics, values may include a probability (e.g., between 0 and 1) or Boolean value (e.g., 0 or 1), whereas for the other metrics that are measured in units of the item, the values can be much greater (e.g., from 0 to 300). Therefore, to effectively visualize all values within the graphical view 802, both the primary ay-axis and secondary y-axis with varying scales may be utilized, as shown in FIG. 8.

As illustrated, the per epoch aggregated values for the first subset of metrics are displayed simultaneously in a single, consolidated graphical view 802. An example first subset of metrics include on hand metrics, demand metrics, order-related metrics, overstock defect metrics, and understock defect metrics associated with the output 216 of the simulation system 106. In some examples, one or more metric types, such as the on hand metrics and the demand forecast metrics, include both an expected projection and a worst case projection.

The on hand metrics may include on hand after delivery 616 and an expected on hand end of day 620 directly output by the simulation system 106, as well as a worst-case on hand end of day 816 computed post-processing. On hand after delivery 616 represents a total number of item units on hand at the node after delivery. The expected on hand end of day 620 represents a total number of item units on hand at the node at the end of the day, after the demand for the day is done (e.g., after no more items can be sold) and after deliveries have likely arrived. The worst-case on hand end of day 816 may be computed based on the expected on hand end of day 620 and the demand metrics (e.g., from the worst-case demand discussed below). The worst-case on hand end of day 816 represents a lowest possible number of units of the first item on hand at the node at the end of the day given a highest possible demand (e.g., a highest number of sales).

The demand metrics may include an expected demand 818 based on the requested 606 metric directly output by the simulation system 106, and a worst-case demand 820 computed post-processing. The expected demand 818 may be a minimum number of item units necessary to fulfill demand. The worst-case demand 820 may be a safety stock adjusted demand computed based on the expected demand 818 and a number of units of the item kept as safety stock at a node to represent the highest possible number of units of the item that could be sold during that epoch. The worst-case demand 820 can be used as part of the computation for the worst-case on hand end of day 816 described above.

The order-related metrics may include on transfer 822, an ideal beginning on hand (BOH) 824, and an order-up-to-level (OTL) 826. On transfer 822 may be a number of units of the item ordered for a node based on request proactive 608 and/or requested reactive 610. The ideal BOH 824 may represent a minimum amount of inventory (e.g., a minimum number of units of an item) that a node needs to have on hand in order to fulfill all requests (e.g., demand). The ideal BOH 824 may be calculated using values for expected demand 818, beginning of period (BOP), and ending of period (EOP), the latter BOP and EOP values discussed below with reference to the list view 806. The OTL 826 may be set by one or more of the policies 306 provided as input to the simulation system 106, and is a number of units that should be on hand at a node at a beginning of an epoch to fulfill the needs of the node. As described in greater detail above with reference to FIG. 6, the OTL 826 is a value used in determining many of the metrics.

The overstock defect metrics may include backroom units after delivery 624 directly output by the simulation system 106 and overstock 828 computed post-processing. Backroom units after delivery 624 represent a maximum number of units over the course of the day that did not fit on the shelf at the node. Overstock 828 may be a difference between inventory of the item (e.g., a number of units of the item) at the node and the expected demand 818 when the expected demand 818 is lower than the inventory.

The understock defect metrics may include understock 830, lost sales 832, and a fill rate 834 computed post processing. Understock 830 may be a difference between inventory of the item (e.g., a number of units of the item) at the node and the expected demand 818 when the expected demand 818 is higher than the inventory. In some examples, understock 830 may be represented as an OOS %, the OOS % determined based on stockouts 650 across all eligible nodes for the item. Lost sales 832 may be a number of units that are predicted to not be sold because the nodes lack sufficient inventory. The fill rate 834 represents unfilled demand for a node, and may be determined based on a difference between values for requested 606 and shipped 632 metrics that are output by the simulation system 106.

The per epoch aggregated values for a second subset of the metrics may be provided for display in the tabular view 804. The second subset of the metrics may include at least the first subset of metrics visually represented in the graphical view 802 and one or more additional metrics associated with the output 216 of the simulation system 106, such as demand over period 836 and first pass 652. Demand over period 836 may be a summation of the worst-case demand 820 determined per epoch over more than one epoch. In some examples, the summation may be the worst-case demand 820 over a specified number of epochs. In other examples, the summation may be worst-case demand 820 over a number of epochs (including portions thereof) until a next order arrives. First pass 652 may be a number of units delivered to the nodes that are immediately put on the shelf.

The tabular view 804 may be comprised of a plurality of columns and a plurality of rows that intersect to form a plurality of cells. The rows may correspond to the plurality of epochs. Here, an epoch is a day, and thus the rows correspond to days in the future. The columns may correspond to the second subset of metrics. Each cell may be populated with the aggregated value of the metric associated with the column on the date associated with the row. For simplicity, aggregated values of the metrics are displayed for three days of the next forty-five days within the tabular view 804. However, aggregated predicted values of the second subset of metrics may be displayed for each day of the forty-five days within the tabular view 804. Additionally, the number of epochs can be extended up to hundreds of days into the future, and aggregated values of the second subset of metrics may be displayed for each epoch.

The list view 806 may display average values for a third subset of metrics, where the third subset of metrics may include at least a portion of the first subset of metrics and one or more additional metrics associated with the inputs 208 and/or the output 216 of the simulation system 106. For example, from the first subset of metrics associated with the output 216 of the simulation system 106, the list view 806 may include average values for expected demand 818, worst-case demand 820, demand over period 836, ideal BOH 824, OTL 826, overstock 828, backroom units after delivery 624, and understock 830. The average values for the first subset of metrics may represent an average of the per epoch aggregated values of the respective metrics across the plurality of epochs. For example, an average value for expected demand 818 may be computed by summing the per epoch aggregated value for expected demand 818 across the plurality of epochs and dividing by the number of the plurality of epochs.

The list view 806 may also include the following additional metrics as part of the third subset of metrics: beginning of period (BOP) 840, ending of period (EOP) 844, authorized total capacity (ATC) 848, UOM 852, and stockout count 866. BOP 840 represents a minimum number of item units needed at the start of the day for visual presentation (e.g., a minimum number of sales floor presentation units (SPUs) at start of the day). EOP 844 represents a minimum number of item units needed at the end of the day for visual presentation (e.g., a minimum number of SPUs at end of the day). The number of SPUs is independent from demand, and is derived from inputs such as facings & shelf capacity, and sales floor presentation rules applied on a per item, per node, per epoch basis. BOP 840 and EOP 844 may be example policies 306 provided as input to the simulation. The average values thereof may represent an average of per epoch aggregated values for the BOP 840 and EOP 844 at the nodes across the plurality of epochs. As shown in FIG. 8, the item selected from the item menu 808 has an average value of about 2 item units for BOP 840 and an average value of 0 item units for EOP 844 at the nodes selected from the node menu 810. These average values for BOP 840 and EOP 844 indicate the item selected has a relatively low presentation requirement, and the enterprise has decided to prioritize beginning of day presentation over end of day presentation.

ATC 848 represents a total shelf capacity (e.g., how may units of an item fit on the sales floor) for a given item at a given node based on planogram data for the node. ATC 848 is provided as part of the domain logic 304 input to the simulation. The average value of ATC 848 may represent an average of a per epoch aggregated value for the ATC 848 at the nodes across the plurality of epochs. The average value of ATC 848 may be used to determine when projected inventory levels (e.g., on hand after delivery 616) will be greater than sales floor capacity and some portion of the inventory will need to go to the backroom.

UOM 852 represents a smallest grouping of units that can moved between nodes at a time. For most nodes, UOM 852 is typically a number of SSPs, but for others the UOM 852 may be a number of eaches or a number of VCPs. UOM 852 may be provided as part of the domain logic 304 as input to the simulation. The average value of UOM 852 may represent an average of a per epoch aggregated value for the UOM 852 at the nodes across the plurality of epochs. The average value for UOM 852 may be helpful for diagnosing overstock or high OTL issues.

Stockout count 866 represents a sum of calculated Boolean measures for on hand end of day 620. For example, if an item at a node on an epoch in the active selection has less than 1 unit of on hand end of day 620, then 1 unit is added to the sum of stockout count 866, otherwise 0 is added. The stockout count 866 may provide a quick indication of how many item/node/epochs in the active selection are out of stock.

The list view 806 may also include average values for a portion of the third subset of metrics in terms of days of supply (DOS). For example, the list view 806 may include average values for BOP DOS 842, EOP DOS 846, ATC DOS 850, UOM DOS 854, ideal BOH DOS 856, OTL DOS 858, overstock DOS 860, backroom units after delivery DOS 862, and understock DOS 864. The DOS metrics provide a numerical and visual representation of the scale of the important inputs and outputs of the simulation. By using a common denominator (e.g., expected demand 818) and conditional formatting, a user can quickly understand if a particular input or output is out of scale with the other values. As one example, if a value of UOM 852 is much larger than the other inputs (e.g., a large or very large UOM scenario) as indicated by a large disparity between the UOM 852 and UOM DOS 854, a user may be able to quickly determine that excess backroom units simulation results are caused by the out of scale UOM 852. This may facilitate business decisions to lower the value of UOM 852 to reduce the number of excess backroom units to optimize inventory levels.

The DOS metrics may be computed post-simulation by taking the average of the parent metric divided by the expected demand 818 for each epoch. For example, for OTL DOS 858, the parent metric is OTL 826, and OTL DOS 858 may be calculated by taking the average of values obtained for each epoch (e.g. each day) in the active selection by dividing OTL 826 for that epoch by the expected demand 818 for that epoch.

As previously discussed, the DOS metrics quickly aid a user's understanding as to whether a particular metric is out of scale with the other values. To further facilitate the user's understanding, the list view 806 may provide a visual scheme, such as coloring, shading, highlighting, animation, or other similar scheme, to indicate or otherwise alert the user to a significant difference between a DOS average value for a metric and an average value for the metric. Different levels of visual scheme may be employed relative to a disparity between the values. For example, a largest disparity may be more boldly indicated, such as the darker shading and outlining of the average value for the ATC DOS 850 within the list view 806.

When viewing the first subset of metrics for the one item aggregated across all the nodes for the next forty-five days within the graphical view 802, the user can quickly observe any trends or patterns in the item's projected inventory position across the nodes over the next forty-five days. For example, across the nodes over the next forty-five days, overstocks defects are minor and there are no understock defects. For example, the per epoch aggregated values for backroom units after delivery 624 and overstock 828 are low (e.g., under 15 item units) over the plurality of epochs. In other words, the value of backroom units after delivery 624 and overstock 828 at each of the nodes when combined on a daily basis is less than 15 items on any given day over the next forty-five days. Moreover, the very low average values of 0.10 units for backroom units after delivery 624 and 0.26 units for overstock 828 for the item at all nodes across the plurality of epochs displayed in the list view 806 further indicates that most of the nodes have no overstock defects at all. In some examples, after the user has viewed and analyzed the graphical view 802, tabular view 804, and/or list view 806 at the first level of granularity (e.g., one item at all nodes), the user may then select a different, second level of granularity for viewing the metrics. For example, the user may be interested in the same one item (e.g., item 111146918), but wants to get more specific details on the one item at the node for which inventory of the item is not optimized (e.g., node 661). Therefore, the user may select node 661 from the node menu 810. In response to the user's selection of the item at the node 661, the per epoch predicted values of metrics for the item at the node 661 are retrieved from the database and visualized within the user interface 800, as described in more detail with reference to FIG. 9

In further examples, the user may adjust one or more of the inputs 208 to the simulation system 106. The simulation system 106 may run the simulation using the adjusted inputs to output new predicted values for metrics, and these new metrics may be displayed to the user in a similar format as described above (e.g., within the graphical view 802, tabular view 804, and list view 806). Thus, the user may be able to quickly visualize how the changes to the inputs 208 affect an inventory position for the item in the future at varying levels of granularity to facilitate supply chain management decisions.

Figure 9:
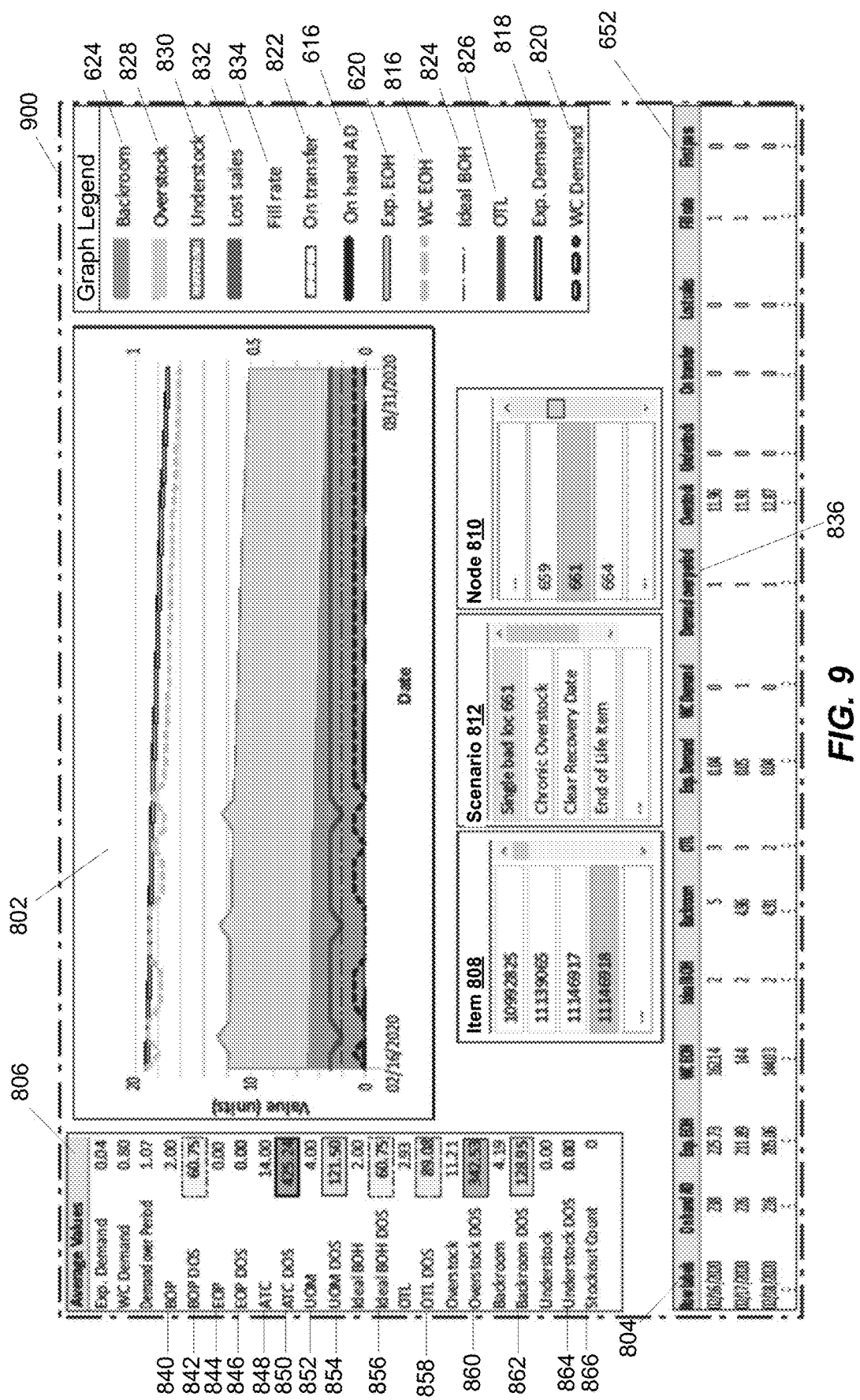
FIG. 9 illustrates another example user interface for displaying metrics associated with the simulation at a second level of granularity.

FIG. 9 illustrates another example user interface 900 displaying metrics associated with the simulation at a second level of granularity. The user interface 900 is similar to the user interface 800 comprising the graphical view 802, the tabular view 804, and the list view 806, described with reference to FIG. 8 above. However, in this example user interface 900, the values of the metrics being displayed therein represent a different, second level of granularity. Therefore, the graphical view 802, the tabular view 804, and the list view 806 include the same metric types and features as described in detail with reference to FIG. 8, however the values therein have been updated to reflect the new, second level of granularity. For example, the user has maintained the selection of the one item (e.g., item 11146918) from the item menu 808, and updated the selection from all nodes to only one node within the node menu 810, where the selected one item at the one node corresponds to the second level of granularity. As illustrated, the node selected from the node menu 810 is specifically the node 661 indicated by the scenario menu 812 as having inventory for the one item that was not optimized (e.g., single bad location 661).

In addition to retrieving inputs 208 from the simulation, predicted values for metrics associated with the output 216 (e.g., the requested metrics 214 and additional metrics computed post-processing) corresponding to the second level of granularity may be retrieved from the database. For example, a predicted value for each type of metric for the one item at the one node for each epoch of the plurality of epochs (e.g., each day for the next forty-five days) can be retrieved from the database utilizing the index. These predicted values for the metrics may then be visualized within one or more of the graphical view 802, tabular view 804, and list view 806.

When viewing the first subset of metrics for the one item at the one node for the next forty-five days represented within the graphical view 802, the user may quickly observe any trends or patterns in predicted behavior at the node over the next forty-five days, as well as the differences in the trends or patterns based on the updated selection from all nodes (e.g., represented in the graphical view 802 in user interface 800) to one node. For example, the user may quickly visualize that the lack of inventory optimization indicated by the scenario menu 812 is a result of overstock caused by a lower demand at this particular node 661.

The values of overstock defect metrics for the item at the node over the next forty-five days, including include backroom units after delivery 624 and overstock 828, are significantly higher than the average for these overstock defect metrics for the item across all nodes displayed in the list view 806 of FIG. 8. For example, the value for the backroom units after delivery 624 ranges from about 5 to 3.5 units of the item and the value for the overstock 828 ranges from about 13 to 10 units of the item at the node over the next forty-five days as compared to the average 0.10 units and 0.26 units across all nodes for backroom units after delivery 624 and overstock 828, respectively. Additionally, the declining value of the backroom units after delivery 624 over the next forty-five days to about 3.5 units leads to alignment with the value for OTL 826 at the node by the end of the next forty-five days.

Moreover, the values of demand metrics for the item at the node over the next forty-five days, including include expected demand 818 and worst-case demand 820 are significantly lower than the average for these demand metrics across all nodes displayed in the list view 806 of FIG. 8. For example, the value for the expected demand 818 ranges from about 0 to 0.05 units and the value for worst-case demand 820 ranges from about 0 to 1 unit of the item at the node over the next forty-five days as compared to the average 0.28 units and 1.54 units of the item across all nodes for the expected demand 818 and worst-case demand 820, respectively.

The user may utilize these observations to determine one or more variables in the supply chain to adjust in order to optimize inventory of the item at the node. In some examples, before implementing these adjustments in the supply chain, the user may want simulate the supply chain with the adjustments to determine if and how much the adjustments will impact the inventory position of the item at the node, as well as potentially other nodes. Therefore, the user may adjust one or more of the inputs 208 to the simulation system 106 accordingly. The simulation system 106 may run the simulation using the adjusted inputs to output new predicted values for metrics, and these new metrics may be displayed to the user in a similar format as described above with reference to FIGS. 8 and 9. Thus, the user may be able to quickly visualize how the changes to the inputs 208 affect the projected inventory position for the item at varying levels of granularity to facilitate supply chain management decisions.

In other examples, the user may be curious as to whether other items stocked by this node (e.g., node 661) have a same or similar overstock issue. The user may select the one or more other items from the item menu 808 and an updated user interface with be provided with corresponding data.

Figure 10:
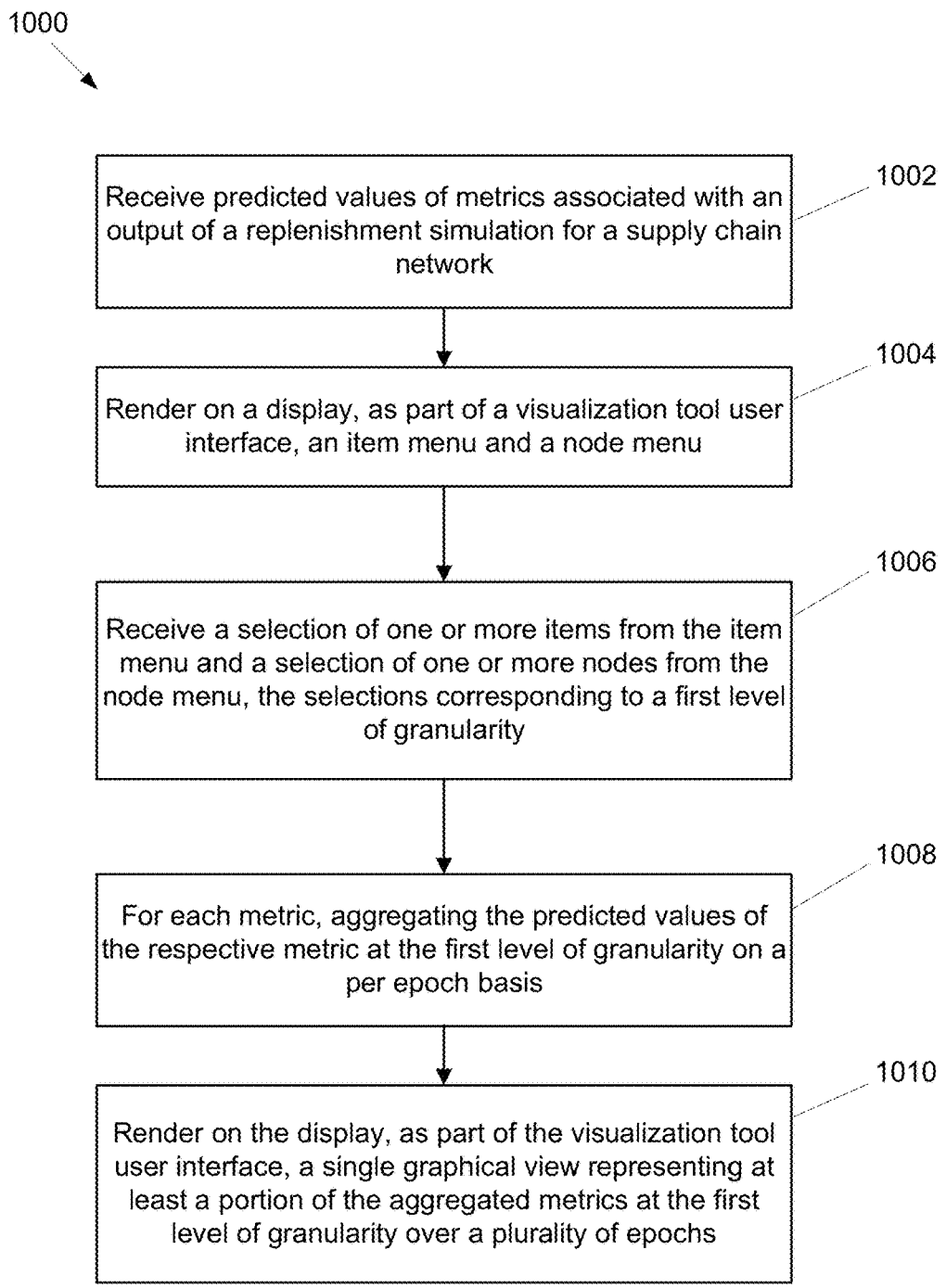
FIG. 10 illustrates an example method for visualizing replenishment simulation output.

FIG. 10 illustrates an example method 1000 for visualizing replenishment simulation output. In some examples, the method 1000 may be performed by the visualization tool 107 described in detail with reference to FIG. 1. In some examples, the visualization tool 107 operates in conjunction with the simulation system 106 to render an interactive user interface (e.g., a visualization tool user interface) on a display of user's device 118. For example, the visualization tool user interface may be rendered via an application that the simulation system 106 and/or visualization tool 107 interoperates with, such as a thick or thin application that is executing on the device 118 of the user. In some examples, the user may be an inventory management data analyst.

The method 1000 begins at operation 1002, where predicted values of metrics associated with an output of a replenishment simulation for a supply chain network (e.g., associated with the output 216 from the simulation system 106) are received. The output may be related to inventory and changes thereto for a plurality of items associated with the supply chain network at a plurality of nodes of the supply chain network over a plurality of epochs. Accordingly, the output may be utilized to visualize projected inventory positions of items across nodes of the supply chain network.

The received predicted values of metrics may include predicted values of metrics directly output from the simulation, as well as additional predicted values of metrics computed post-simulation based on one or more of the predicted values of metrics directly output from the simulation, for example. The predicted values for the metrics, whether direct or computed post-simulation, are received on a per item, per node, per epoch basis. The predicted values for the metrics may include a number of units of the respective item, where the values may be fractional allowing for partial units of the respective item. Using fractional values instead of integer values may facilitate aggregation of the values according to various levels of granularity, discussed in detail below, and improve accuracy of projections. In some examples, the predicted values may also include a probability (e.g., between 0 and 1) or Boolean value (e.g., 0 or 1).

Upon receiving the predicted values of the metrics associated with the replenishment simulation output at operation 1002, in some examples, the predicted values for the metrics can be enhanced using basic calculations (e.g., sum, average, standard deviation, maximum, minimum), and stored in a database associated with the visualization tool 107. For storage, each predicted value can be indexed according to a particular metric type, an item, a node, and an epoch with which the predicted value is associated with to facilitate subsequent retrieval and aggregation.

At operation 1004, an item menu 808 and a node menu 810 are rendered on a display (e.g., the display of the user's device 118) as part of the visualization tool user interface, such as user interface 800. The item menu 808 may include the plurality of items associated with the supply chain network for selection. The node menu 810 may include the plurality of nodes of the supply chain network for selection. The item and node menus enable the user to select a level of granularity for viewing the metrics.

At operation 1006, a selection of one or more items from the item menu 808 and a selection of one or more nodes from the node menu 810 are received, the selections corresponding to a first level of granularity. As one example, the user selects a first item at a first node and a second node.

At operation 1008, for each metric, the predicted values of the respective metric are aggregated at the first level of granularity on a per epoch basis. For example, predicted values for each of the metrics corresponding to the first level of granularity (e.g., the first item at the first and second nodes) may be retrieved from the database using the index and may be aggregated on a per epoch basis over the plurality of epochs (e.g., n days). Continuing the previous example, the index may be used to identify and retrieve predicted values for each metric type of the first item at the first and second nodes on a per epoch basis over the plurality of epochs. For example, a predicted value of a first metric for the first item at the first node on a first day of the next n days is aggregated with a predicted value of the first metric for the first item at the second node on the first day of the next n days to produce an aggregated value of the first metric for the first day. A similar aggregation is performed on predicted values for each remaining metric of the first item on the first day to produce a plurality of aggregated metrics for the first day. This same aggregation process is then repeated for each remaining day of the next n days.

At operation 1010, a single graphical view 802 is rendered on the display as part of the visualization tool user interface. The single graphical view 802 may represent at least a portion of the aggregated metrics at the first level of granularity over the plurality of epochs. The portion or subset of aggregated metrics represented in the single graphical view 802 may include on hand metrics, demand metrics, order-related metrics, overstock defect metrics, and understock defect metrics. For one or more of the metric types, such as the on hand metrics and demand metrics, an expected projection and a worst-case projection may be represented within the single graphical view 802. In some examples, a tabular view 804 and/or a list view 806 may also be rendered on the display as part of the visualization tool user interface, as described in detail with reference to FIGS. 8 and 9.

Operations 1006 to 1010 may be performed iteratively as selections of new levels of granularity to view the metrics (e.g., selections of different combinations of item and/or nodes) are received. Additionally, operations 1002 to 1010 may be performed iteratively in response to receiving new or updated output 216 from the simulation system 106. As one example, the user may desire to determine how changing one or more of the inputs 208 to the simulation (e.g., additional purchase orders, decreased lead time, etc.) affects the output 216 and ultimately the projected or future inventory positions across nodes of the supply chain, among other similar "what if" scenarios, to facilitate supply chain management decisions.

The operations 1002 to 1010 are included for illustration purposes. Visualizing metrics associated with replenishment simulation output may be implemented by similar processes with fewer or additional operations, as well as in different order of operations using the principles described herein. The operations described herein may be executed by one or more processors operated on one or more computing devices, one or more processor cores, and/or specialized processing devices, among other examples.

The examples provided in FIGS. 1 through 10 are illustrated with specific systems, devices, processes, and user interfaces. Embodiments are not limited to environments according to these examples. Similar simulation for supply chain replenishment may be implemented in environments employing fewer or additional systems, devices, processes, and user interfaces. Furthermore, the example systems, devices, processes, and user interfaces shown in FIGS. 1 through 10 may be implemented in a similar manner with other values using the principles described herein.

Figure 11:
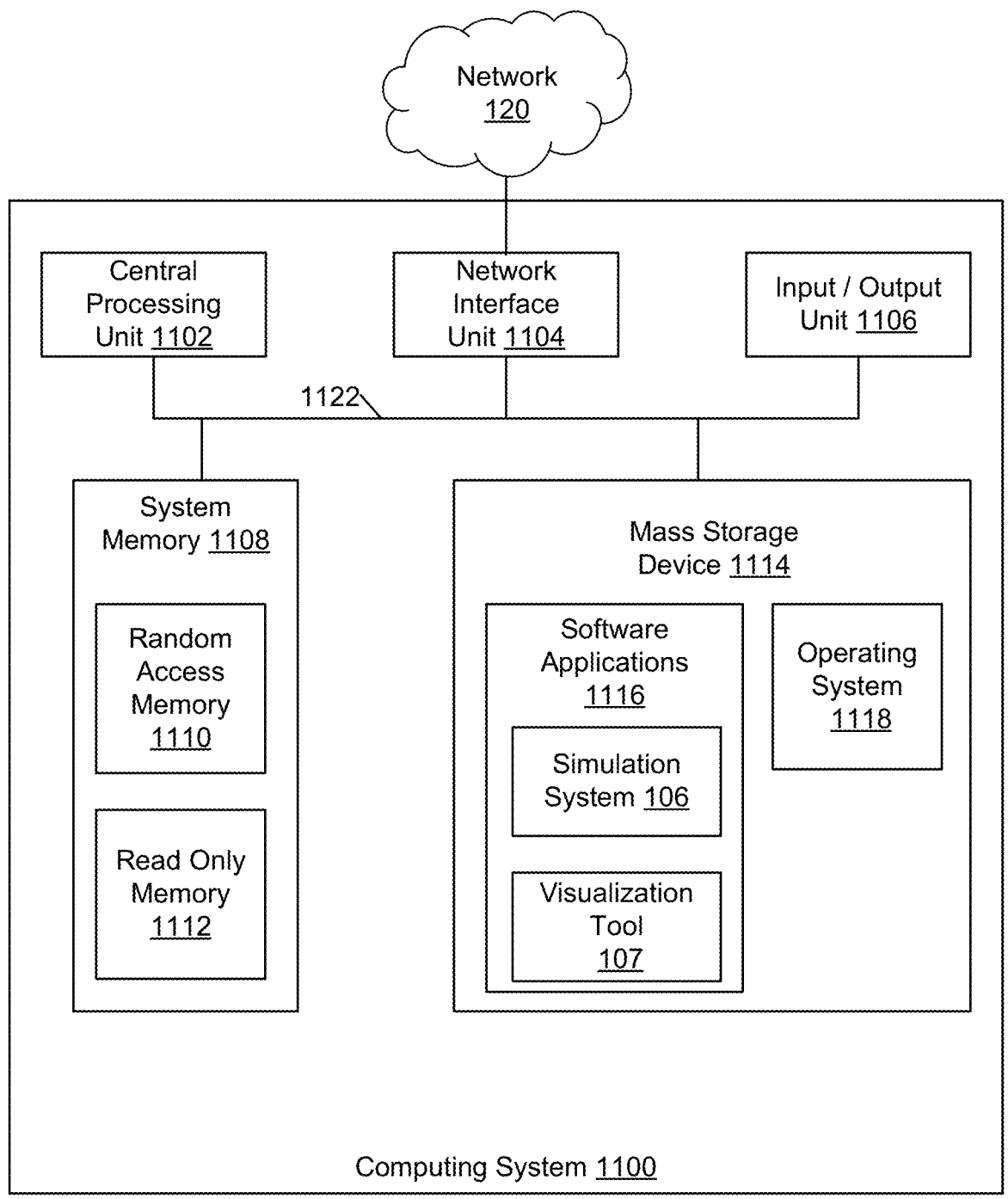
FIG. 11 illustrates an example block diagram of a computing system.

FIG. 11 illustrates an example block diagram of a computing system 1100. One or more aspects of the computing system 1100 can be used to implement the service 102, the simulation system 106, and the visualization tool 107 as described in greater detail with reference to FIG. 1.

In the embodiment shown, the computing system 1100 includes at least one CPU (Central Processing Unit) 1102, a system memory 1108, and a system bus 1122 that couples the system memory 1108 to the CPU 1102. The system memory 1108 includes RAM (Random Access Memory) 1110 and ROM (Read-Only Memory) 1112. A basic input/output system that contains the basic routines that help to transfer information between elements within the computing system 1100, such as during startup, is stored in the ROM 1112. The computing system 1100 further includes a mass storage device 1114. The mass storage device 1114 is able to store software instructions and data. In many examples, the one or more processors 104 are each implemented as the at least one CPU 1102.

The mass storage device 1114 is connected to the CPU 1102 through a mass storage controller (not shown) connected to the system bus 1122. The mass storage device 1114 and its associated computer-readable data storage media provide non-volatile, non-transitory storage for the computing system 1100. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 1100.

According to various embodiments of the invention, the computing system 1100 may operate in a networked environment using logical connections to remote network devices through the network 120. The computing system 1100 may connect to the network 120 through a network interface unit 1104 connected to the system bus 1122. It should be appreciated that the network interface unit 1104 may also be utilized to connect to other types of networks and remote computing systems. The computing system 1100 also includes an input/output unit 1106 for receiving and processing input from a number of other devices, including a touch user interface display screen, or another type of input device. Similarly, the input/output unit 1106 may provide output to a touch user interface display screen or other type of output device.

As mentioned briefly above, the mass storage device 1114 and the RAM 1110 of the computing system 1100 can store software instructions and data. The software instructions include an operating system 1118 suitable for controlling the operation of the computing system 1100. The mass storage device 1114 and/or the RAM 1110 also store software instructions, that when executed by the CPU 1102, cause one or more of the systems, devices, or components described herein to provide functionality described herein. For example, the mass storage device 1114 and/or the RAM 1110 can store software instructions that, when executed by the CPU 1102, cause the computing system 1100 to receive and execute processes of the simulation system 106 for simulating replenishment within a supply chain network and/or execute processes of the visualization tool 107 for displaying projected item inventory positions based on replenishment simulation output.

Referring to FIGS. 1-11 generally, and according to some examples, methods for simulating a per epoch run-state of a supply chain for an item at a node of a network are described. In an example method, for an epoch, a plurality of inputs are received. The plurality of inputs may include at least a forecasted demand for the item, domain logic associated with the supply chain, and one or more policies. A stream of action events based on the plurality of inputs may be generated, a current run-state of the supply chain may be retrieved, and the stream of action events may be applied to the current run-state of the supply chain to yield a stream of observation events. A request for one or more metrics may be received, and the stream of observation events may be transformed to predict a value for the one or more metrics. The predicted value for the one or more metrics may be provided as output for the epoch, where a future run-state of the supply chain is generated based on output for a plurality of epochs, including the epoch, for implementation in supply chain management decisions.

In other examples, a model is generated for each of the one or more metrics to transform the stream of observation events to predict the value for the one or more metrics. To generate the model, a value for the respective metric may be computed for each trace of a plurality of traces, where a trace comprises the receipt of the plurality of inputs, the generation of the stream of action events, the retrieval of the current run-state, and the application of the stream of action events to the current run-state, and the trace is repeated to produce the plurality of traces, the value for the respective metric may be aggregated over the plurality of traces, and the model may be generated based on the aggregation.

In further examples, to generate the stream of action events, a plurality of action events may be determined based on the plurality of inputs, and the plurality of action events may be merged to generate the stream of action events. For each type of action event, logic may be defined for updating a run-state of the supply chain based on the respective action event. A type of each action event may be determined within the stream of action events, and the respective logic for each action event within the stream of action events may be applied to the current run-state of the supply chain to yield the stream of observation events.

In yet further examples, the value for the one or more metrics provided as output may be displayed in one or more of a graphical and tabular format in a user interface. A report that includes the value for the one or more metrics provided as output may be generated. The per epoch run-state of the supply chain may be simulated for each of a plurality of items at a plurality of nodes of the network for the plurality of epochs.

According to other examples, systems for simulating a per epoch run-state of a supply chain for an item at a node of a network are described. An example system may include a processor, and a memory communicatively coupled to the processor that stores instructions. When executed by the processor, the instructions cause the system to receive, for an epoch, a plurality of inputs. The plurality of the inputs may include at least a forecasted demand for the item at the node, domain logic associated with the supply chain, and one or more policies. The instructions further cause the system to generate a stream of action events based on the plurality of inputs, retrieve a current run-state of the supply chain, and apply the stream of action events to the current run-state of the supply chain to yield a stream of observation events. The instructions further cause the system to receive a request for one or more metrics, transform the stream of observation events to predict a value for the one or more metrics, and provide the predicted value for the one or more metrics as output for the epoch, where a future run-state of the supply chain is generated based on output for a plurality of epochs, including the epoch, for implementation in supply chain management decisions.

In some examples, action events within the stream of action events include a start action event, a demand action event, a receive shipment action event, a proactive replenish action event, and/or reactive replenish action event. The forecasted demand for the item may be a probability distribution of demand for the item at the node during the epoch. A single demand action event may be generated based on a total number of items predicted to be sold during the epoch based on the probability distribution of demand or a plurality of demand action events may be generated, each representing one or more of the total number items predicted to be sold at a particular time during the epoch based on the probability distribution of demand.

In further examples, the domain logic associated with the supply chain may include network inputs, product inputs, node inputs, arc inputs, and/or operation perturbations. The one or more policies may be generated based on the current run-state of the supply chain and one or more business objectives. The policies may include a proactive policy that is evaluated at a single fixed time during the epoch and/or a reactive policy that is evaluated in response to receiving new information associated with the current run-state of the supply chain or the one or more business objectives. The plurality of inputs may further include known external inputs associated with the epoch.

In yet further examples, the one or more metrics may be associated with an inventory level of the item at the node and changes to the inventory level during the epoch. The metrics may include one or more of requested, requested proactive, requested reactive, on hand before delivery, on order before delivery, on hand after delivery, on order after delivery, on hand end of day, on order end of day, backroom units after delivery, allocated, allocated shortage, allocated overage, shipped, shipped vcp, shipped ssp, shipped each, received, received vcp, received ssp, had no stockouts, stockouts, unfilled demand, first pass units, stocking density, and ideal inventory position. A type of the metrics requested may be based on a type of simulation being performed and/or a subsequent process for which the output is to be provided as input.

According to further examples, non-transitory computer-readable media with instructions stored thereon for simulating a per epoch run-state of a supply chain for an item at a node of a network are described. The instructions may include receiving, for an epoch, a plurality of inputs, including at least a forecasted demand for the item at the node, domain logic associated with the supply chain, and one or more policies. The instructions may also include generating a stream of action events based on the plurality of inputs, retrieving a current run-state of the supply chain, and applying the stream of action events to the current run-state of the supply chain to yield a stream of observation events. The instructions may further include receiving a request for one or more metrics, transforming the stream of observation events to predict a value for the one or more metrics, and providing the predicted value for the one or more metrics as output for the epoch, where a future run-state of the supply chain is generated based on output for a plurality of epochs, including the epoch, for implementation in supply chain management decisions.

In some examples, each action event in the stream of action events may yield a corresponding observation event in the stream of observation events.

According to some examples, methods for visualizing projected inventory positions of items across nodes of a supply chain network are described. An example method includes receiving predicted values of metrics associated with an output of a replenishment simulation for the supply chain network. The output may be related to inventory and changes thereto for a plurality of items at a plurality of nodes over a plurality of epochs, and the predicted values for the metrics may be received on a per item, per node, per epoch basis. The example may also include rendering on a display, as part of a visualization tool user interface, an item menu comprising the plurality of items for selection and a node menu comprising the plurality of nodes for selection. The item menu and the node menu may enable a user to select a level of granularity for viewing the metrics. The example method may further include receiving a selection of one or more items from the item menu and a selection of one or more nodes from the node menu, the received selections corresponding to a first level of granularity, and, for each metric, aggregating the predicted values of the respective metric at the first level of granularity on a per epoch basis. The example method may yet further include rendering on the display, as part of the visualization tool user interface, a single graphical view representing at least a portion of the aggregated metrics at the first level of granularity over at least a portion of the plurality of epochs, where the portion of the aggregated metrics includes an expected projection and a worst case projection for one or more metric types.

In other examples, aggregating the predicted values of the respective metric at the first level of granularity on the per epoch basis may include aggregating the predicted values of the respective metric for each of the selected one or more items at each of the selected one or more nodes on the per epoch basis. The predicted values of the metrics may be stored in a database, where each predicted value may be indexed for storage based on a type of metric, an item, a node, and an epoch with which the predicted value is associated with. In response to receiving the selection of the one or more items and the one or more nodes, the index may be used to retrieve a portion of the predicted values for the metrics stored in the database that correspond to the selected one or more items at the selected one or more nodes over the plurality of epochs. A selection of one or more of the portion of the aggregated metrics and the portion of the plurality of epochs to be represented in the single graphical view may be received.

In further examples, the portion of the aggregated metrics represented in the single graphical view include one or more of on hand metrics, demand forecast metrics, order-related metrics, overstock defect metrics, and understock defect metrics. The portion of the aggregated metrics may include the expected projection and the worst case projection for at least the on hand metrics and the demand forecast metrics. One or more of a tabular view and a list view may also be rendered on the display as part of the visualization tool user interface. The tabular view may represent the portion of the aggregated metrics and one or more additional aggregated metrics at the first level of granularity over the portion of the plurality of epochs. The list view may represent, for at least some of the portion of aggregated metrics and one or more additional aggregated metrics, average predicted values across the selected one or more items at the selected one or more nodes over the portion of the plurality of epochs.

In yet further examples, another selection from one or more of the item menu and the node menu may be received, where the selection corresponds to a second level of granularity. For each metric, the predicted values of the respective metric may be aggregated at the second level of granularity on a per epoch basis, and a single graphical view representing the portion of the aggregated metrics at the second level of granularity over the portion of the plurality of epochs may be rendered on the display as part of the visualization tool user interface. New predicted values for the metrics associated with an output from the replenishment simulation for the supply chain network may be, where the new predicted values for the metrics resulting from a change to one or more inputs of the replenishment simulation. For each metric, the new predicted values of the respective metric may be aggregated at the first level of granularity on a per epoch basis to produce new aggregated metrics, and a single graphical view representing at least a portion of the new aggregated metrics at the first level of granularity over the portion of the plurality of epochs may be rendering on the display as part of the visualization tool user interface.

According to other examples, example computing devices are described. An example computing device may include a display, a processor, and a memory communicatively coupled to the processor. The memory stores instructions that, when executed by the processor, cause the system to render on the display, as part of a visualization tool user interface, an item menu comprising a plurality of selectable items associated with the supply chain network and a node menu comprising a plurality of selectable nodes of the supply chain network, receive a selection of one or more items from the item menu and a selection of one or more nodes from the node menu, and render on the display, as part of the visualization tool user interface, a single graphical view representing a subset of metrics for the selected one or more items at the selected one or more nodes over a plurality of epochs. The metrics may be associated with output of a replenishment simulation for the supply chain network, where the output is related to inventory and changes thereto over the plurality of epochs, and the subset of the metrics may include at least an expected projection and a worst case projection for one or more metric types.

In some examples, the instructions, when executed by the processor, further cause the system to update the plurality of selectable nodes displayed within the node menu, when the selection of the one or more items is received prior to the selection of the one or more nodes, to exclude nodes that are not associated with the selected one or more items, or update the plurality of selectable items displayed within the item menu, when the selection of the one or more nodes is received prior to the selection of the one or more items, to exclude items that are not associated with the selected one or more nodes. The subset of metrics represented in the single graphical view include one or more of on hand after delivery, expected on hand end of day, worst-case on hand end of day, expected demand, worst-case demand, order up to level, ideal inventory position, on transfer, backroom units after delivery, overstock, understock, lost sales, and fill rate.

In other examples, the output associated with the replenishment simulation may include predicted values of requested metrics directly output by the replenishment simulation on a per item, per node, per epoch basis and/or predicted values of additional metrics computed post-simulation on a per item, per node, per epoch basis based on one or more of the predicted values of the requested metrics directly output by the replenishment simulation. The plurality of nodes may include one or more of distribution centers and stores of the supply chain network.

According to further examples, example computing systems are described that include a processor and a memory, the memory storing instructions for executing a visualization tool application, that when executed by the processer, generates a user interface for displaying projected inventory positions of items across nodes of a supply chain network. An example user interface includes an item menu comprising a plurality of selectable items associated with the supply chain network, a node menu comprising a plurality of selectable nodes of the supply chain network, and a single graphical view representing a first set of metrics for one or more items selected from the item menu at one or more nodes selected from the node menu over a plurality of epochs. The metrics may be associated with output of a replenishment simulation for the supply chain network, where the output is related to inventory and changes thereto over the plurality of epochs, and first set of the metrics may include at least an expected projection and a worst case projection for one or more metric types.

In some examples, the first set of metrics represented in the single graphical view are, for each metric within the first set of metrics, predicted values for each of the selected one or more items at each of the selected one or more nodes aggregated on a per epoch basis. The user interface may further include a scenario menu that includes a plurality of selectable scenarios. A scenario may be automatically selected from the scenario menu based on the selected one or more items and the selected one or more nodes.

In other examples, the user interface may further include a tabular view displaying predicted values of a second set of the metrics for the selected one or more items at the selected one or more nodes on a per epoch basis over the plurality of epochs, where the second set of the metrics may include the first set of the metrics and one or more additional metrics. The user interface may further include a list view displaying average predicted values of a third set of the metrics for the selected one or more items at the selected one or more nodes across the plurality of epochs, where the third set of the metrics may include at least a portion of the first set of the metrics and one or more additional metrics.

Embodiments of the present disclosure can be implemented as a computer process (method), a computing system, or as an article of manufacture, such as a computer program product or computer readable media. The computer program product may be a computer storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The present disclosure is not to be limited in terms of the particular embodiments described in this application, which are intended as illustrations of various aspects. Many modifications and variations can be made without departing from its spirit and scope. Functionally equivalent methods and systems within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only, and is not intended to be limiting.

The above specification, examples and data provide a complete description of the use of the invention. Since many embodiments of the invention can be made without departing from the spirit and scope of the invention, the invention resides in the claims hereinafter appended.

The invention claimed is:

1. A method for visualizing projected inventory positions of items across stores of a supply chain network, the method comprising:

generating and providing a graphical user interface (GUI), as part of a visualization tool, to a computing device;

receiving a selection for an event-based manner of simulation;

executing, by a simulation computing system in response to receiving the selection, a first simulation process that outputs a first stream of observation events in a first order, the first stream of observation events being ordered over a course of each epoch of a plurality of epochs, wherein the first stream of observation events are related to inventory and changes thereto for a plurality of items at a plurality of stores of the supply chain network over the plurality of epochs;

aggregating the first stream of observation events according to the first order to generate first simulation data including predicted values for metrics;

rendering on a display of the computing device of a plurality of computing devices, on the GUI as part of the visualization tool, a single consolidated graphical view including an item menu comprising the plurality of items for selection and a store menu comprising a network of stores for selection, the item menu and the store menu enabling a user to select a level of granularity for viewing the metrics;

receiving, at the computing device via the GUI, a selection of one or more items from the item menu and a selection of one or more stores from the store menu, the received selections corresponding to a first level of granularity;

retrieving, by the visualization tool, a portion of the predicted values for the metrics that correspond to the first level of granularity using an index to retrieve the portion of the predicted values;

for each metric, aggregating, by the visualization tool, the predicted values of the respective metric at the first level of granularity on a per epoch basis;

rendering on the display of the computing device, as part of the GUI, the single consolidated graphical view with a representation of a plurality of simulation data types including at least the portion of the aggregated metrics at the first level of granularity over at least the portion of the plurality of epochs, wherein the portion of the aggregated metrics includes an expected projection and a worst case projection for one or more metric types;

receiving a second selection for a per epoch-based manner of simulation;

executing, by the simulation computing system in response to receiving the second selection, a second simulation process that outputs a second stream of observation events in a second order different from the first order, the second stream of observation events being grouped and ordered by event type for simplified evaluation, wherein observed events in the first stream of observation events are different from observed events in the second stream of observation events based on changes to simulation logic across the supply chain network caused by differences in the first order and the second order;

aggregating the second stream of observation events according to the second order to generate second simulation data, wherein the first simulation data is different from the second simulation data; and rendering on the display of the computing device, on the GUI as part of the visualization tool, the single consolidated graphical view with a second representation of the second simulation data, including a second subset of metrics for the selected one or more items at the selected one or more stores over the plurality of epochs at the first level of granularity.

2. The method of claim 1, wherein aggregating the predicted values of the respective metric at the first level of granularity on the per epoch basis comprises aggregating the predicted values of the respective metric for each of the selected one or more items at each of the selected one or more stores on the per epoch basis.

3. The method of claim 1, further comprising receiving a selection of one or more of the portion of the aggregated metrics and the portion of the plurality of epochs to be represented in the single graphical view.

4. The method of claim 1, wherein the portion of the aggregated metrics represented in the single graphical view include one or more of on hand metrics, demand forecast metrics, order-related metrics, overstock defect metrics, and understock defect metrics.

5. The method of claim 4, wherein the portion of the aggregated metrics include the expected projection and the worst case projection for at least the on hand metrics and the demand forecast metrics.

6. The method of claim 1, further comprising rendering on the display, as part of the GUI, one or more of:
a tabular view representing the portion of the aggregated metrics and one or more additional aggregated metrics at the first level of granularity over the portion of the plurality of epochs; and
a list view representing, for at least some of the portion of aggregated metrics and one or more additional aggregated metrics, average predicted values across the selected one or more items at the selected one or more stores over the portion of the plurality of epochs.

7. The method of claim 1, further comprising:
receiving another selection from one or more of the item menu and the store menu, the selection corresponding to a second level of granularity;
for each metric, aggregating the predicted values of the respective metric at the second level of granularity on a per epoch basis; and
rendering on the display, as part of the GUI, a single graphical view representing the portion of the aggregated metrics at the second level of granularity over the portion of the plurality of epochs.

8. The method of claim 1, further comprising:
receiving new predicted values for the metrics associated with an output from a third simulation process, the new predicted values for the metrics resulting from a change to one or more inputs of the third simulation process;
for each metric, aggregating the new predicted values of the respective metric at the first level of granularity on a per epoch basis to produce new aggregated metrics; and
rendering on the display, as part of the GUI, a single graphical view representing at least a portion of the new aggregated metrics at the first level of granularity over the portion of the plurality of epochs.

9. A computing device comprising:
a display;
a processor; and
a memory communicatively coupled to the processor, the memory storing instructions that, when executed by the processor, cause the computing device to:
render, on the display, a graphical user interface (GUI) received from a server as part of a visualization tool, the GUI including a single consolidated graphical view with an item menu comprising a plurality of selectable items associated with a supply chain network, a store menu comprising a plurality of selectable stores of the supply chain network, and a manner of simulation menu comprising a per epoch-based manner of simulation selection and an event-based manner of simulation selection;
receive selections at the GUI including a selection of one or more items from the item menu, a selection of one or more stores from the store menu, and a selection of the event-based manner of simulation selection from the manner of simulation menu, the received selections corresponding to a first level of granularity;
provide the selections to the server, wherein the server executes a first simulation process that outputs a first stream of observation events in a first order, the first stream of observation events being ordered over a course of each epoch of a plurality of epochs, the first stream of observation events related to inventory and changes thereto over the plurality of epochs, and wherein the server aggregates the first stream of observation events according to the first order to generate first simulation data;
render on the display, as part of the GUI, the single consolidated graphical view with a representation of the first simulation data, received from the server, including a subset of metrics for the selected one or more items at the selected one or more stores over the plurality of epochs at the first level of granularity;
receive a second selection for the per epoch-based manner of simulation selection from the manner of simulation menu;
provide the second selection to the server, wherein the server executes a second simulation process that outputs a second stream of observation events in a second order different from the first order, the second stream of observation events being grouped and ordered by event type for simplified evaluation, wherein the server aggregates the second stream of observation events according to the second order to generate second simulation data, wherein the first simulation data is different from the second simulation data, wherein observed events in the first stream of observation events are different from observed events in the second stream of observation events based on changes to simulation logic across the supply chain network caused by differences in the first order and the second order; and
render on the display, as part of the GUI, the single consolidated graphical view with a second representation of the second simulation data, received from the server, including a second subset of metrics for the selected one or more items at the selected one or more stores over the plurality of epochs at the first level of granularity.

10. The computing device of claim 9, wherein the instructions, when executed by the processor, further cause the system to:
when the selection of the one or more items is received prior to the selection of the one or more stores, update the plurality of selectable stores displayed within the store menu to exclude stores that are not associated with the selected one or more items; or
when the selection of the one or more stores is received prior to the selection of the one or more items, update the plurality of selectable items displayed within the item menu to exclude items that are not associated with the selected one or more stores.

11. The computing device of claim 9, wherein the subset of metrics represented in the single graphical view include one or more of on hand after delivery, expected on hand end of day, worst-case on hand end of day, expected demand, worst-case demand, order up to level, ideal beginning on hand, on transfer, backroom units after delivery, overstock, understock, lost sales, and fill rate.

12. The computing device of claim 9, wherein the output associated with the replenishment simulation further includes one or more of:
the predicted values of requested metrics directly output by the replenishment simulation on a per item, per store, per epoch basis; and
additional predicted values of additional metrics computed post-simulation on a per item, per store, per epoch basis based on one or more of the predicted values of the requested metrics directly output by the replenishment simulation.

13. The computing device of claim 9, wherein the plurality of stores further include one or more of distribution centers of the supply chain network.

14. A computing system including a processor and a memory, the memory storing instructions for executing a visualization tool, that when executed by the processor, generates a graphical user interface (GUI) for displaying projected inventory positions of items across stores of a supply chain network, the GUI comprising:
a manner of simulation menu comprising a per epoch-based manner of simulation selection and an event-based manner of simulation selection;
an item menu comprising a plurality of selectable items associated with the supply chain network;
a store menu comprising a plurality of selectable stores of the supply chain network;
a single consolidated graphical view representing a first set of metrics for one or more items selected from the item menu at one or more stores selected from the store menu over a plurality of epochs at a first level of granularity;
in response to a first selection of the event-based manner of simulation selection from the manner of simulation menu:
determine the first set of metrics from first simulation data generated by aggregating a first stream of observation events according to a first order, the first stream of observation events output from a first replenishment simulation for the supply chain network, the replenishment simulation being executed as part of a simulation computing system, the output related to inventory and changes thereto over the plurality of epochs, and the first stream of observation events are ordered over a course of each epoch of the plurality of epochs; and
in response to a second selection of the per epoch-based manner of simulation selection from the manner of simulation menu:
determine update the set of values for the first set of metrics from second simulation data generated by aggregating a second stream of observation events according to a second order, the second stream of observation events output from a second replenishment simulation for the supply chain network, the second stream of observation events are grouped and ordered grouped and ordered by event type for simplified evaluation,
wherein the first simulation data is different from the second simulation data, wherein observed events in the first stream of observation events are different from observed events in the second stream of observation events based on changes to simulation logic across the supply chain network caused by differences in the first order and the second order.

15. The computing system of claim 14, wherein the first set of metrics represented in the single graphical view are, for each metric within the first set of metrics, a set of the predicted values for each of the selected one or more items at each of the selected one or more stores aggregated on a per epoch basis.

16. The computing system of claim 14, wherein the user interface further comprises a scenario menu that includes a plurality of selectable scenarios.

17. The computing system of claim 16, wherein a scenario is automatically selected from the scenario menu based on the selected one or more items and the selected one or more stores.

18. The computing system of claim 14, wherein the user interface further comprises a tabular view displaying a second set of the predicted values of a second set of the metrics for the selected one or more items at the selected one or more stores on a per epoch basis over the plurality of epochs, the second set of the metrics including the first set of the metrics and one or more additional metrics.

19. The computing system of claim 14, wherein the user interface further comprises a list view displaying average predicted values of a third set of the metrics for the selected one or more items at the selected one or more stores across the plurality of epochs, the third set of the metrics including at least a portion of the first set of the metrics and one or more additional metrics.

20. The method of claim 1, further comprising:
storing the predicted values of the metrics in a database, wherein each predicted value is indexed for storage based on a type of metric, an item, a store, and an epoch with which the predicted value is associated with; and
in response to receiving the selection of the one or more items and the one or more stores, using the index to retrieve a portion of the predicted values for the metrics stored in the database that correspond to the selected one or more items at the selected one or more stores over the plurality of epochs.

* * * * *